US010865719B2

(12) United States Patent
Yuuki et al.

(10) Patent No.: US 10,865,719 B2
(45) Date of Patent: Dec. 15, 2020

(54) KNOCKING DETECTION METHOD, IGNITION TIMING CONTROL METHOD, AND IGNITION TIMING CONTROL SYSTEM

(71) Applicant: MITSUBISHI HEAVY INDUSTRIES, LTD., Tokyo (JP)

(72) Inventors: Akihiro Yuuki, Tokyo (JP); Daisuke Takemoto, Tokyo (JP); Yuta Furukawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 345 days.

(21) Appl. No.: 16/070,595

(22) PCT Filed: Dec. 27, 2016

(86) PCT No.: PCT/JP2016/088810
§ 371 (c)(1),
(2) Date: Jul. 17, 2018

(87) PCT Pub. No.: WO2017/126304
PCT Pub. Date: Jul. 27, 2017

(65) Prior Publication Data
US 2020/0325835 A1 Oct. 15, 2020

(30) Foreign Application Priority Data
Jan. 22, 2016 (JP) ................................ 2016-010723

(51) Int. Cl.
*G06F 1/00* (2006.01)
*F02D 35/02* (2006.01)
(Continued)

(52) U.S. Cl.
CPC ............ *F02D 35/027* (2013.01); *F02P 5/152* (2013.01); *F02D 35/023* (2013.01); *F02D 37/02* (2013.01);
(Continued)

(58) Field of Classification Search
CPC ...... F02D 35/027; F02D 41/1498; F02P 5/00; F02P 5/04; F02P 5/1455; F02P 5/15;
(Continued)

(56) References Cited

U.S. PATENT DOCUMENTS 4,328,779 A * 5/1982 Hattori .................... F02P 5/151 123/406.23
4,558,674 A * 12/1985 Okado .................... F02P 5/152 123/406.37
(Continued)

FOREIGN PATENT DOCUMENTS

EP 2330284 A1 6/2011
JP 2007-231903 A 9/2007
(Continued)

OTHER PUBLICATIONS

European Office Action for European Application No. 16886542.6, dated Sep. 30, 2019.
(Continued)

*Primary Examiner* — John Kwon
(74) *Attorney, Agent, or Firm* — Birch, Stewart, Kolasch & Birch, LLP.

(57) ABSTRACT

A knocking detection method includes: a step of obtaining an oscillation waveform generated by combustion in the combustion chamber; a step of setting a first time window preceding a maximum inner pressure time at which an inner pressure of the combustion chamber is at maximum in a single combustion cycle and a second time window immediately after the maximum inner pressure time, and transforming each of a first waveform portion included in the first time window and a second waveform portion included in the second time window into an expression-domain expression, of the oscillation waveform; and a step of extracting a first peak at which amplitude of the frequency domain expression of the first waveform portion is at maximum in the first
(Continued)

frequency windows and a second value at which the amplitude of the frequency domain region of the second waveform portion is at maximum in the second frequency window and determining whether knocking has occurred on the basis of the second peak value and the first peak value.

12 Claims, 9 Drawing Sheets

(51) Int. Cl.

| | |
|---|---|
| ***F02P 5/152*** | (2006.01) |
| *F02D 41/14* | (2006.01) |
| *F02P 17/12* | (2006.01) |
| *F02D 41/28* | (2006.01) |
| *F02D 37/02* | (2006.01) |

(52) U.S. Cl.
CPC ................ *F02D 2041/1432* (2013.01); *F02D 2041/288* (2013.01); *F02P 2017/128* (2013.01)

(58) Field of Classification Search
CPC ........ F02P 5/151; F02P 5/1521; F02P 5/1522; F02P 5/1526
USPC .......... 701/111; 123/406.23, 406.29, 406.34, 123/406.37, 406.38, 406.41
See application file for complete search history.

(56) References Cited

U.S. PATENT DOCUMENTS

| | | | | |
|---|---|---|---|---|
| 4,745,902 | A * | 5/1988 | Yagi | F02P 5/1455 123/406.42 |
| 5,979,406 | A * | 11/1999 | Aoki | F02P 5/1525 123/406.37 |
| 6,301,957 | B1 * | 10/2001 | Sakaguchi | G01L 1/242 73/114.18 |
| 10,082,093 | B2 | 9/2018 | Takayanagi et al. | |
| 2008/0051975 | A1 * | 2/2008 | Ker | G01M 15/12 701/102 |
| 2010/0242912 | A1 * | 9/2010 | Folkerts | G01L 23/225 123/435 |
| 2016/0333806 | A1 | 11/2016 | Takayanagi et al. | |

FOREIGN PATENT DOCUMENTS

| | | | |
|---|---|---|---|
| JP | 2015-132185 | A | 7/2015 |
| WO | WO 2015/033371 | A1 | 3/2015 |
| WO | WO 2015-104909 | A1 | 7/2015 |

OTHER PUBLICATIONS

Extended European Search Report for European Applicaticn No. 16886542.6, dated Dec. 14, 2018.

* cited by examiner

KNOCKING DETECTION METHOD, IGNITION TIMING CONTROL METHOD, AND IGNITION TIMING CONTROL SYSTEM

TECHNICAL FIELD

The present disclosure relates to a detection method for detecting a knocking occurrence state in an internal combustion engine. The present disclosure further relates to an ignition timing control method of appropriately controlling the ignition timing of the internal combustion engine in accordance with the knocking occurrence state detected by the detection method, and a control system that controls the ignition timing of the internal combustion engine by using the ignition timing control method.

BACKGROUND ART

Generally, the earlier the ignition timing in each combustion cycle is, the efficiency of the internal combustion engine increases. However, an earlier ignition increases the risk of occurrence of knocking due to abnormal combustion in a combustion chamber. Knocking refers to self-ignition of end gas that remains non-combusted in the combustion chamber after ignition, and such self-ignition produces impact wave that breaks a thermal boundary layer formed on the inner wall surface of the combustion chamber. Accordingly, the surface temperature of the inner wall surface of the combustion chamber increases excessively, which may cause damage to the combustion chamber. Thus, to operate the internal combustion engine as efficiently as possible while avoiding damage to the internal combustion engine due to knocking as much as possible, it is desirable to control the ignition timing of the internal combustion engine appropriately on the basis of the trade-off relationship between improvement of the efficiency of the internal combustion engine and a decrease in the knocking frequency.

For this, it is important to detect the knocking occurrence state in the combustion chamber of the internal combustion engine as accurately as possible. Patent Document 1 described below discloses a knocking detection method. As described in Patent Document 1, a typically-used evaluation index of knocking strength is knocking severity. However, in many cases, a knocking detection result detected from the knocking severity contradicts with typical knocking characteristics that are actually observed.

Patent Document 1 discloses a knocking detection method that is more advantageous than detection based on knocking severity, which is a knocking determination method capable of detecting of a serious knocking that may damage the combustion chamber considerably at an early stage. Specifically, Patent Document 1 discloses a knocking determination method including the following determination process. First, a knocking time window and a band-pass filter are used to extract a waveform signal of a knocking frequency from measurement data of inner pressure or acceleration obtained by a sensor disposed in the combustion chamber, and the first calculation value is obtained by integration. Next, a reference time window and a band-pass filter are used to extract a waveform signal of a reference frequency from the above measurement data, the second calculation value is obtained by integration, and a reference average value is obtained from moving average over a plurality of combustion cycles. The first calculation value obtained as described above is divided by the reference average value to obtain a S/N ratio, which is weighted by a weight coefficient, and moving average is obtained over a plurality of combustion cycles. Accordingly, a knocking index is calculated, on the basis of which presence or absence of knocking is determined.

CITATION LIST

Patent Literature

Patent Document 1: JP2015-132185A

SUMMARY

Problems to be Solved

However, from the perspective of detecting occurrence of knocking at a highest possible accuracy, the knocking determination method in Patent Document 1 fails to appropriately select the time range for setting the knocking time window and the reference time window on a reasonable basis. This will be described below in detail.

The above described S/N ratio indicates the relative magnitude of the index value obtained from the knocking frequency waveform in a knocking occurrence period, as compared to the moving average of the index value obtained from the frequency waveform in a period without knocking. Thus, to achieve a highly accurate correlation of the above described S/N ratio and the knocking occurrence risk, the knocking time window should include only the time range with a high risk of occurrence of knocking without omission. On the other hand, the reference time window should be set so as to include only the time range with a minimum risk of occurrence of knocking. However, in the knocking determination method in Patent Document 1, the knocking time window is set to match the combustion period of the combustion chamber, but is not set to include only the time range with a high risk of occurrence of knocking without omission. Furthermore, in the knocking determination method in Patent Document 1, the reference time window is set so as to include a non-combustion period of the combustion chamber, but is not set to include only the time range with a minimum risk of occurrence of knocking.

In view of the above problem, an object of some embodiment of the present invention is to provide a knocking detection method capable of knocking detection with a higher accuracy, by selecting the setting range of the time window corresponding to a knocking occurrence period and the time window corresponding to a period without knocking appropriately on a reasonable basis. Furthermore, an object of some embodiments of the present invention is to provide an ignition timing control method of appropriately controlling the ignition timing of the internal combustion engine in accordance with the knocking occurrence state detected by the knocking detection method, and a control system that controls the ignition timing of the internal combustion engine by using the ignition timing control method.

Solution to the Problems (1) According to some embodiments of the present invention, a knocking detection method of detecting occurrence of knocking in a combustion chamber of an internal combustion engine includes: a step of obtaining an oscillation waveform generated by combustion of air-fuel mixture in the combustion chamber; a step of setting a first time window preceding a maximum inner pressure time at which an inner pressure of the combustion chamber is at maximum in a single combustion cycle and a second time window immediately after the maximum inner pressure time, and transforming each of a first waveform portion included in the first time window and a second waveform portion included in the second time window into an expression-domain expression, of the oscillation waveform; and a step of setting a first frequency window and a second frequency window, calculating a first representative value which is a representative value of the frequency domain expression of the first waveform portion in the first frequency window and a second representative value which is a representative value of the frequency domain expression of the second waveform portion in the second frequency window, and determining whether knocking has occurred on the basis of a relationship between the second representative value and the first representative value.

In the method shown in FIG. 1, the point of time corresponding to the crank angle phase at which the inner pressure of the combustion chamber reaches its maximum in a single combustion cycle is defined as the maximum inner pressure time, while setting the first time window as a time range preceding the maximum inner pressure time, and the second time window as a time range immediately after the maximum inner pressure time. Accordingly, the second time window positioned immediately after the maximum inner pressure time is set so as to include only a time range with a high risk of occurrence of knocking, without omission. Furthermore, the first time window positioned in a time range before the maximum inner pressure time is set so as to include only the time range with a minimum risk of occurrence of knocking. Thus, the second time window and the first time window correspond to a time window corresponding to a knocking occurrence period and a time window corresponding to a period without knocking, respectively. Furthermore, in the specific method (1), the setting range of the time window corresponding to a knocking occurrence period and the setting range of the time window corresponding to a period without knocking are selected appropriately on a reasonable basis.

Further, in the above method (1), the risk of occurrence of knocking is evaluated on the basis of two representative values obtained from the frequency domain expressions of two respective waveform portions included in the second time window and the first time window, respectively, from the oscillation waveform generated by combustion of air-fuel mixture. As a result, with this method (1), it is possible to evaluate the risk of occurrence of knocking while relatively comparing a representative value of the frequency spectrum obtained from the oscillation waveform in a knocking occurrence period to a representative value of the frequency spectrum obtained from the oscillation waveform in a period without knocking. Therefore, according to the above method (1), the setting range of the time window corresponding to a knocking occurrence period and the setting range of the time window corresponding to a period without knocking are selected appropriately on a reasonable basis, and thereby it is possible to detect knocking with a higher accuracy.

(2) According to an illustrative embodiment of the present invention, the first representative value includes a first peak value at which an amplitude of the frequency domain expression of the first waveform portion is at maximum in the first frequency window. The second representative value includes a second peak value at which an amplitude of the frequency domain expression of the second waveform portion is at maximum in the second frequency window. The step of determining whether knocking has occurred includes determining whether knocking has occurred on the basis of a relationship between the second peak value and the first peak value.

According to the above method (2), when obtaining a representative value of the frequency domain expression, by using the peak value of a frequency spectrum curve corresponding to the frequency domain expression as a representative value, it is possible to obtain a representative value at a high speed through simple calculation. Thus, according to the above method (2), the process of determining whether knocking has occurred can be performed at a high speed with a low calculation load.

(3) In an illustrative embodiment of the present invention, in the above method (1), the first representative value includes a first partial overall (POA) value which is a POA value calculated from the frequency domain expression of the first waveform portion in the first frequency window. The second representative value includes a second POA value which is a POA value calculated from the frequency domain expression of the second waveform portion in the second frequency window. The step of determining whether knocking has occurred includes determining whether knocking has occurred on the basis of a relationship between the second POA value and the first POA value.

According to the above method (3), when obtaining a representative value of the frequency domain expression, a partial overall (POA) value of a frequency spectrum curve corresponding to the frequency domain expression is used as a representative value. A POA value is obtained by calculating the power spectrum of the frequency domain expression, calculating the power spectrum density on the basis of the calculated power spectrum, and calculating the square sum of the power spectrum density near the knocking frequency. Thus, when obtaining a representative value of the frequency domain expression, by using the POA value calculated as described above as a representative value, it is possible to obtain a representative value taking account of all of the frequency components near the knocking frequency in the frequency domain expression. Thus, according to the above method (3), in the process of determining whether knocking has occurred, it is possible to use a representative value taking account of all of the frequency components near the knocking frequency in the frequency domain expression.

(4) In an illustrative embodiment according to the present invention, in the above methods (1) to (3), the first frequency window and the second frequency window are selected so as to include a frequency component which appears as a peak frequency, of a frequency component of an impact wave generated in the combustion chamber due to knocking occurrence.

According to the above method (4), the first frequency window and the second frequency window are set so as to always include a frequency component that appears as a peak frequency, from among frequency components of the impact wave generated in the combustion chamber due to occurrence of knocking. As a result, the peak value of the frequency spectrum obtained from the oscillation waveform in a knocking occurrence period and the peak value of the frequency spectrum obtained from the oscillation waveform in a period without knocking are extracted from a vicinity frequency range surrounding the peak frequency unique to the time of occurrence of knocking. Furthermore, the peak value of the frequency spectrum obtained from the oscillation waveform in a knocking occurrence period and the peak value of the frequency spectrum obtained from the oscillation waveform in a period without knocking are extracted from a common peak vicinity frequency range. As a result, according to the above method (4), it is possible to evaluate the risk of occurrence of knocking even more accurately, by relatively comparing a peak value of the frequency spectrum obtained from the oscillation waveform in a knocking occurrence period to a peak value of the frequency spectrum obtained from the oscillation waveform in a period without knocking.

(5) In an illustrative embodiment according to the present invention, in the above methods (1) to (4), the combustion chamber further comprises a precombustion chamber including an ignition plug disposed therein, and a main chamber in communication with the precombustion chamber via a nozzle hole, and wherein, in each combustion cycle of the internal combustion engine, the first window is set so as to include an ignition timing of the ignition plug.

In the above method (5), the above described first time window is set so as to include a timing of ignition of the ignition plug in the precombustion chamber. Herein, on ignition of the precombustion chamber, only a small amount of fuel gas for producing a torch exists in the precombustion chamber, and is directly ignited by the ignition plug. Thus, the risk of knocking due to abnormal combustion is extremely low. In addition, on ignition of the precombustion chamber, it is possible to observe the oscillation waveform due to combustion of air-fuel mixture while knocking is not occurring. Accordingly, it is possible to evaluate the risk of occurrence of knocking even more accurately, by comparing the peak values of two frequency spectra obtained from two waveform portions included in the first time window including the ignition timing of the precombustion chamber and the second time window corresponding to a knocking period, respectively.

(6) In an illustrative embodiment according to the present invention, in the above methods (1) to (5), transform of the first waveform portion or the second waveform portion into the frequency domain expression includes a process of transforming a time-series sample of the first waveform portion or the second waveform portion into a set including an amplitude value of each sampling frequency by fast Fourier transform (FFT).

In the above method (6), the transform of the first waveform portion or the second waveform portion into a frequency domain expression is performed by applying a fast Fourier transform (FFT) to a time-series sample of the first waveform portion or the second waveform portion. Thus, it is possible to provide a plurality of (K) converters corresponding to a plurality of (K) sampling frequencies on the frequency axis, and to perform the calculation process of discrete Fourier transform on a plurality of time-series samples in parallel by using the plurality of (K) converters of parallel configuration. As a result, it is possible to perform fast transform of the first waveform portion or the second waveform portion to the frequency domain expression. Accordingly, even in a case where the rotation speed of the crank shaft is extremely high and it is necessary to detect occurrence of knocking in an extremely short period of time for each combustion cycle, it is possible to perform the frequency domain transform for the first waveform portion or the second waveform portion with a high speed in such determination.

(7) In an illustrative embodiment according to the present invention, in the above methods (1) to (6), a cylinder constituting the combustion chamber in the internal combustion engine includes an inner pressure measurement device configured to measure and output an inner pressure variation waveform in the combustion chamber of the internal combustion engine. The oscillation waveform is extracted as a harmonic component from the inner pressure variation waveform in the combustion chamber of the internal combustion engine measured by the inner pressure measurement device, and the harmonic component includes an oscillation frequency component which is unique to the time of occurrence of knocking.

Of physical amounts that can be measured in the combustion chamber of the internal combustion engine, the physical amounts having the strongest correlation with knocking strength include variation of the inner pressure in the combustion chamber, and the acceleration measured from oscillation generated inside the combustion chamber. According to the above method (7), only by providing a simple inner pressure measurement device such as an in-cylinder pressure sensor, in the cylinder constituting the combustion chamber of the internal combustion engine, it is possible to obtain an oscillation waveform in the combustion chamber necessary for detection of knocking, from the inner pressure variation waveform in the combustion chamber measured by the inner pressure measurement device. At this time, in the above method (7), an oscillation frequency component that is unique to the time of occurrence of knocking is extracted from the measured inner pressure variation waveform. Accordingly, in the above method (7), it is possible to extract, from the measured inner pressure variation waveform, only the frequency component excluding the basic frequency component that varies synchronously with the advancement of the combustion cycle (each stage of combustion cycle), as the oscillation frequency component unique to the time of occurrence of knocking.

(8) In an illustrative embodiment according to the present invention, in the above methods (1) to (6), a cylinder constituting the combustion chamber in the internal combustion engine includes an acceleration sensor configured to detect and output an acceleration detection waveform in the combustion chamber of the internal combustion engine, and the oscillation waveform is obtained as the acceleration detection waveform detected by the acceleration sensor in the internal combustion engine.

Of physical amounts that can be measured in the combustion chamber of the internal combustion engine, the physical amounts having the strongest correlation with knocking strength include variation of the inner pressure in the combustion chamber, and the acceleration measured from oscillation generated inside the combustion chamber. In the above embodiment (8), only by providing the acceleration sensor having a simple configuration for the combustion chamber of the gas engine, it is possible to directly obtain an oscillation waveform corresponding to the oscillation frequency component unique to the time of occurrence of knocking, from the acceleration variation waveform measured by the acceleration sensor.

(9) According to some embodiments of the present invention, an ignition timing control method of controlling an ignition timing of ignition of air-fuel mixture in a combustion chamber of an internal combustion engine includes: a detection step of detecting presence or absence of occurrence of knocking in each combustion cycle for the ignition timing which is currently set; a correlation update step of calculating a variation trend, up to a present time, of a knocking occurrence frequency on the basis of a result of detection of the presence or absence of occurrence of knocking, and updating a correlation between a change in the ignition timing and the knocking occurrence frequency to the latest state; and an ignition timing control step of controlling the ignition timing of the internal combustion engine on the basis of the correlation. The detection step includes: obtaining an oscillation waveform which is generated by combustion of air-fuel mixture in the combustion chamber; setting a first time window preceding a maximum inner pressure time at which an inner pressure of the combustion chamber is at maximum in a single combustion cycle and a second time window immediately after the maximum inner pressure time, and transforming each of a first waveform portion included in the first time window and a second waveform portion included in the second time window into an expression-domain expression, of the oscillation waveform; and setting a first frequency window and a second frequency window, extracting a first representative value which is a representative value of the frequency domain expression of the first waveform portion in the first frequency window and a second representative value which is a representative value of the frequency domain expression of the second waveform portion in the second frequency window, and determining whether knocking has occurred on the basis of a relationship between the second representative value and the first representative value.

According to the above method (9), by a method similar to that in the above (1), it is possible to detect knocking occurrence of each combustion cycle accurately and to control the ignition timing so that the ignition timing of the internal combustion engine becomes optimum, on the basis of the knocking detection result of each combustion cycle. At this time, the earlier the ignition timing in each combustion cycle is, the efficiency of the internal combustion engine increases, but the risk of occurrence of knocking in a combustion chamber increases. Thus, according to the above embodiment (9), by appropriately controlling the ignition timing on the basis of the trade-off relationship between improvement of efficiency of the internal combustion engine and reduction of knocking occurrence frequency, it is possible to operate the internal combustion engine as efficiently as possible while avoiding damage to the internal combustion engine due to knocking as much as possible.

(10) In an embodiment according to the present invention, in the above method (9), the knocking occurrence frequency is calculated as a proportion of a combustion cycle in which occurrence of knocking is detected to total combustion cycles.

Further, according to the above method (10), the knocking occurrence frequency is calculated as a proportion of combustion cycles in which knocking occurrence is detected to total combustion cycles. Further, in the above method (10), a correlation between the knocking occurrence frequency obtained as described above and a change in the ignition timing is calculated, and the ignition timing of the internal combustion engine is controlled on the basis of the correlation. Thus, according to the above method (10), by detecting presence or absence of occurrence of knocking for a large number of combustion cycles and controlling the ignition timing on the basis of the detection result, it is possible to reduce the influence of variability of the knocking detection accuracy among combustion cycles. Further, according to the above method (10), by controlling the ignition timing on the basis of the knocking detection result obtained for a large number of combustion cycles, it is possible to reduce the influence of variability of sensibility of sensors used in the knocking detection part.

Advantageous Effects

According to some embodiments of the present invention, the setting range of the time window corresponding to a knocking occurrence period and the setting range of the time window corresponding to a period without knocking are selected appropriately, and thereby it is possible to detect knocking with a higher accuracy.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of an equal state such as "same" "equal" and "uniform" shall not be construed as indicating only the state in which the feature is strictly equal, but also includes a state in which there is a tolerance or a difference that can still achieve the same function. On the other hand, an expression such as "comprise", "include", "have", "contain" and "constitute" are not intended to be exclusive of other components.

In the following description, before describing some embodiments according to the present invention, necessity of the ignition timing control taking account of knocking for an internal combustion engine, and the points that should be improved for the ignition timing control will be described in detail with reference to FIG. 3. Subsequently, with reference to FIGS. 1 and 2, a control system for controlling the ignition timing of the internal combustion engine while taking account of the knocking detection result in accordance with some embodiments of the present invention will be described. Next, according to some embodiments of the present invention, the knocking detection method to be performed in the control system will be described with reference to FIGS. 4 to 9.

Figure 3A:
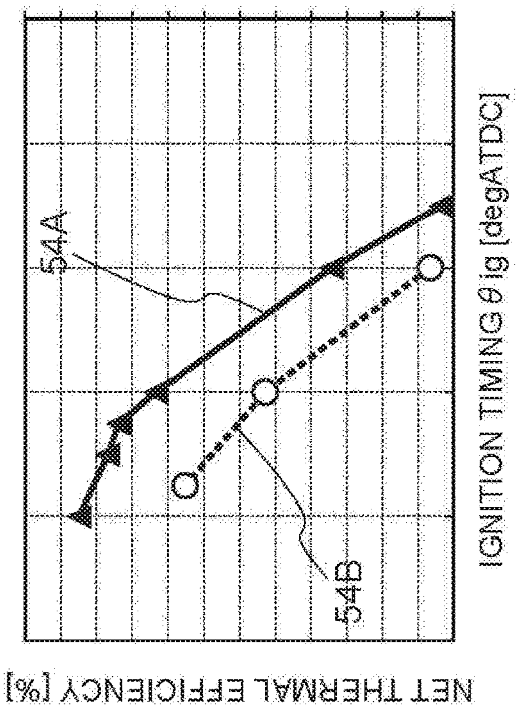
FIGS. 3A and 3B are diagrams showing change in the thermal efficiency and the knocking index of the internal combustion engine with respect to advancement of the crank angle phase.
Figure 3B:
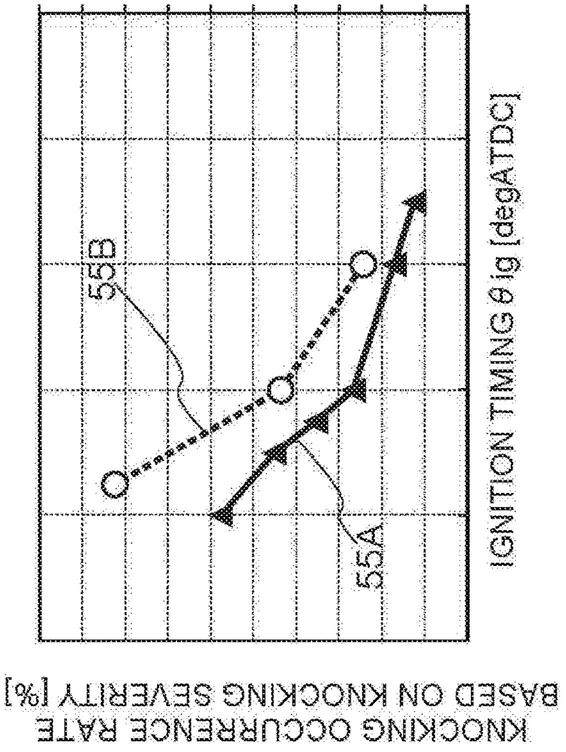

FIG. 3 is a diagram showing change in the thermal efficiency and the knocking index of an internal combustion engine with respect to advancement of the crank angle phase, in the internal combustion engine. The two curves 54A and 54B shown in FIG. 3A indicate the variation of the thermal efficiency in response to a change in the ignition timing $\theta_{ig}$ of the internal combustion engine in a test operation of the internal combustion engine under two different condition settings (the first condition setting and the second condition setting). Herein, the condition setting specifies values to be set as the air excess ratio λ, the precombustion chamber gas flow rate Qp, the methane number MN, and the intake air temperature Ts in a test operation of the internal combustion engine. That is, the thermal efficiency variation curve 54A plotted by triangular marks and the thermal efficiency variation curve 54B plotted by round marks in FIG. 3A are curves obtained by setting two different values for the air excess ratio λ, the precombustion chamber gas flow rate Qp, the methane number MN, and the intake air temperature Ts in a test operation of the internal combustion engine, as the first condition setting and the second condition setting. Furthermore, the two curves 55A and 55B shown in FIG. 3B indicate the variation of the knocking occurrence frequency calculated on the basis of knocking severity in response to a change in the ignition timing $\theta_{ig}$ of the internal combustion engine in a test operation of the internal combustion engine, under the same two different condition settings as those shown in FIG. 3A. The knocking severity is a knocking index correlated to the frequency of occurrence of knocking or the risk of occurrence of knocking, during operation of the internal combustion engine. Typically, it has been considered that a greater knocking severity indicates a higher frequency and a higher risk of occurrence of knocking.

As can be seen from comparison of the curves shown in FIGS. 3A and 3B, at an earlier phase of the ignition timing $\theta_{ig}$ in each combustion cycle, it is possible to operate the internal combustion engine at a higher thermal efficiency. However, an earlier phase of the ignition timing $\theta_{ig}$ leads to an increase in the risk of occurrence of knocking due to abnormal combustion in a combustion chamber. As a method for addressing the above, for instance, one may consider controlling the ignition timing $\theta_{ig}$ of the internal combustion engine appropriately on the basis of the trade-off relationship between improvement of the efficiency of the internal combustion engine and a decrease in the knocking frequency. In this way, it is possible to operate the internal combustion engine as efficiently as possible while avoiding damage to the internal combustion engine due to knocking as much as possible. For this, it is necessary to accurately detect the occurrence frequency and the strength of knocking which occurs during operation of the internal combustion engine, and control the ignition timing $\theta_{ig}$ of the internal combustion engine appropriately taking account of the detection result of knocking.

However, in many cases, a knocking detection result detected from the knocking severity contradicts with typical knocking characteristics that are actually observed. That is, with the knocking detection technique based on knocking severity, it may be difficult to detect occurrence of knocking accurately at a high accuracy. For instance, in some cases, when the phase of the ignition timing $\theta_{ig}$ is set to become earlier gradually, the variation curve of knocking occurrence frequency based on knocking severity does not monotonically increases but tends to protrude upward with respect to the phase advancement of the ignition timing (i.e., tends to decrease after the local maximum point). Thus, in some embodiments according to the present invention, disclosed is a detection mechanism capable of detecting occurrence of knocking accurately at a higher accuracy than that of the knocking detection technique based on knocking severity, and an ignition timing control system including such a detection mechanism.

Figure 1:
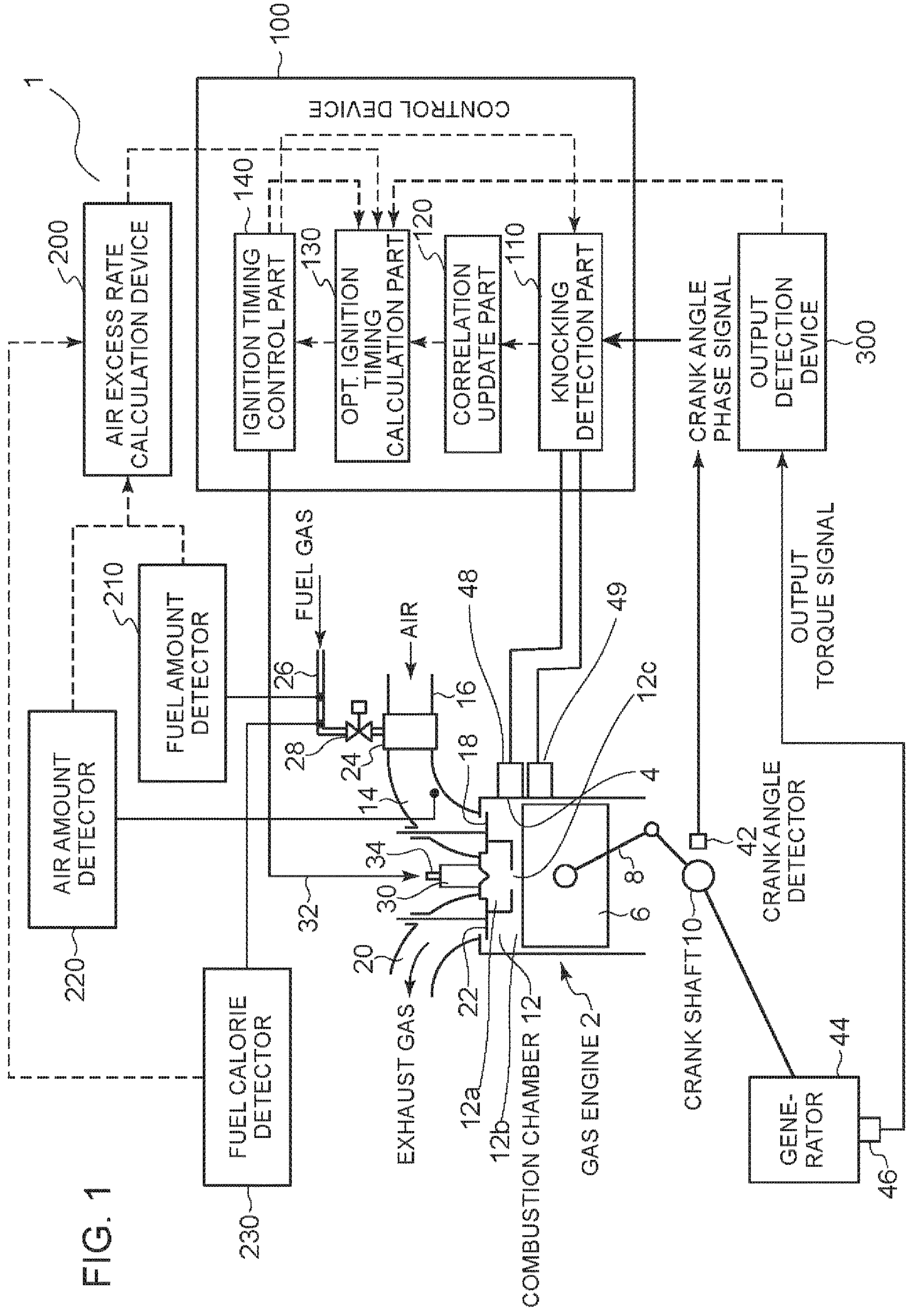
FIG. 1 is a configuration diagram showing an internal combustion engine and an ignition timing control system according to some embodiments of the present invention.

FIG. 1 is a diagram showing a control system 1 for controlling the internal combustion engine according to some embodiments of the present invention, and a gas engine 2, which is an example of an internal combustion engine to be controlled. First, before describing the configuration of the control system 1 according to some embodiments of the present invention, the gas engine 2 to be controlled by the control system 1 will be described with reference to FIG. 1. In the following embodiment to be described with reference to FIGS. 1 to 9, the gas engine 2 is assumed to be a single-cylinder engine, to simplify the description. However, the following embodiment described with reference to FIGS. 1 to 9 can be performed similarly by using a multi-cylinder engine.

The gas engine 2 includes a cylinder 4, and a piston 6 connected mechanically to a crank shaft 10 via a crank 8. The space defined by the upper surface of the piston 6 and the capacity part of the cylinder 4 is the combustion chamber 12. A crank angle detector 42 is disposed on the crank shaft 10, and is configured to detect a phase angle of the crank shaft 10 and output a signal representing the current crank angle phase (crank angle phase signal) to the control device 100 described below. Furthermore, the crank shaft 10 is connected to a generator 44 configured such that a rotor rotates with rotation of the crank shaft 10. The generator 44 includes a torque sensor 46 that generates a detection signal of output torque of the crank shaft 10 from a current level and a voltage level of power generated. The torque sensor 46 outputs the generated detection signal of output torque to an output detection device 300 described below.

The cylinder 4 includes an air supply valve 18, an exhaust valve 22, and an ignition plug 30, on the upper surface of the combustion chamber 12. An air supply pipe 14 is connected to the air supply valve 18, and a mixer 24 for mixing air and fuel gas is connected to the air supply pipe 14. A fuel supply pipe 26 for supplying fuel gas to the mixer 24 and an intake pipe 16 for supplying air to the mixer 24 are connected to the mixer 24. A fuel adjustment valve 28 for adjusting the fuel supply amount to the mixer 24 is disposed on the connection portion between the mixer 24 and the fuel supply pipe 26. Furthermore, an exhaust pipe 20 is connected to the exhaust valve 22. Furthermore, the combustion chamber 12 formed by the upper surface of the piston 6 and the capacity part of the cylinder 4 may include a precombustion chamber 12*a* including an ignition plug disposed therein, and a main chamber 12*b* which is in communication with the precombustion chamber 12*a* via a nozzle hole 12*c*. In this case, on ignition of the precombustion chamber 12*a*, only a small amount of fuel gas for producing a torch exists in the precombustion chamber 12*a*, and is directly ignited by the ignition plug. Furthermore, the air-fuel mixture in the main chamber 12*b* being in communication with the precombustion chamber 12*a* via the nozzle hole 12*c* is ignited by a torch that jets out from the nozzle hole 12*c* in response to ignition of the precombustion chamber 12*a*.

Furthermore, the cylinder 4 includes an inner pressure measurement device 48 for measuring the inner pressure inside the combustion chamber 12. The inner pressure measurement device 48 measures a change in the inner pressure inside the combustion chamber 12, and outputs the change in the form of an inner pressure variation curve to a knocking detection part 110 described below. The cylinder 4 includes an inner pressure measurement device 48 for measuring the inner pressure inside the combustion chamber 12. The inner pressure measurement device 48 measures a change in the inner pressure inside the combustion chamber 12, and outputs the change in the form of an inner pressure variation curve. The cylinder 4 includes an acceleration sensor 49 which measures oscillation that occurs on the inner wall surface of the combustion chamber 12 due to pressure waves that occur upon combustion of air-fuel mixture in the combustion chamber 12 in the form of acceleration, and outputs the measurement value of the acceleration as an acceleration signal to a knocking detection part 110 described below.

Subsequently, with reference to FIG. 1, a control system 1 for controlling the gas engine 2 according to some embodiments of the present invention will be described. The control system 1 shown in FIG. 1 performs a control operation for controlling the ignition timing of the gas engine 2. The ignition timing is a cycle timing at which the air-fuel mixture supplied to the combustion chamber 12 is to be ignited, in each combustion cycle of the gas engine 2, represented as a crank angle phase. Meanwhile, to control the ignition timing to be optimum in each combustion cycle in the gas engine, it is necessary to detect the knocking occurrence state in the combustion chamber as accurately as possible, and determine the ignition timing for each combustion cycle on the basis of the detected knocking occurrence state appropriately. This is because, the earlier the ignition timing in each combustion cycle is, the higher the efficiency of the internal combustion engine is. However, an earlier ignition increases the risk of occurrence of knocking due to abnormal combustion in the combustion chamber.

The control system 1 includes an air excess rate calculation device 200 for calculating an air excess rate of air-fuel mixture supplied to the combustion chamber 12, an output detection device 300 for detecting the output torque of the crank shaft 10, and a control device 100 for controlling the ignition timing of the gas engine 2. The air excess rate calculation device 200 receives the detection value of the supply amount of fuel and the measurement value of the precombustion chamber gas flow rate Qp from the fuel amount detector 210 connected to the fuel supply pipe 26. Further, the air excess rate calculation device 200 receives a caloric value of fuel gas and a detection value of the methane number MN from the fuel calorie detector 230 connected to the fuel supply pipe 26, and receives a detection value of the air amount from the air amount detector 220 connected to the air supply pipe 14. Furthermore, the air amount detector 220 includes a built-in thermometer (not shown) for measuring the intake temperature Ts, and outputs a measurement value of the intake temperature Ts to the air excess rate calculation device 200. Next, the air excess rate calculation device 200 calculates an air excess rate λ from the detection value of the supply amount of fuel gas, the detection value of the caloric value of fuel gas, and the detection value of the air amount, and outputs the air excess rate λ to the control device 100 together with the precombustion chamber gas flow rate Qp, the methane number MN, and the intake temperature Ts.

The output detection device 300 receives an electric signal (output torque signal) indicating the torque detection value of the crank shaft from the torque sensor 46, and outputs output torque detection value information representing the output torque of the crank shaft in watt to the control device 100. Furthermore, the inner pressure measurement device 48 and the acceleration sensor 49 provided for the cylinder 4 output a measurement value of the inner pressure inside the combustion chamber 12 and a measurement value obtained by measuring oscillation occurring on the inner wall surface of the combustion chamber 12 as acceleration to the control device 100.

The control device 100 includes a knocking detection part 110, a correlation update part 120, an optimum ignition timing calculation part 130, and an ignition timing control part 140. The knocking detection part 110 receives a crank angle phase signal representing the current crank angle phase θ from the crank angle detector 42, and receives the currently-set ignition timing $\theta_{og}$ from the ignition timing control part 140. Furthermore, the knocking detection part 110 receives the measurement value of the inner pressure variation inside the combustion chamber 12 and the measurement value obtained by measuring oscillation occurring on the inner wall surface of the combustion chamber 12 as acceleration, from the inner pressure measurement device 48 and the acceleration sensor 49.

Next, the knocking detection part 110 detects presence or absence of knocking occurrence every combustion cycle, for the currently-set ignition timing $\theta_{ig}$ on the basis of the measurement value of the inner pressure variation and the measurement value of the acceleration variation received from the inner pressure measurement device 48 and the acceleration sensor 49. Further, the knocking detection part 110 outputs a knock-flag value $F_{knock}$ to the correlation update part 120 as a knocking detection result of each combustion cycle. Herein, the knock-flag value $F_{knock}$ is at 1 if the knocking detection part 110 detects occurrence of knocking in a combustion cycle, and is at 0 if knocking occurrence is not detected in a combustion cycle. The operation of the knocking detection part 110 to detect presence or absence of knocking occurrence every combustion cycle and output the knock-flag value $F_{knock}$ every combustion cycle is performed repeatedly over a predetermined number CN of combustion cycles.

The correlation update part 120 receives CN knock-flag values $F_{knock}$ outputted over CN combustion cycles from the knocking detection part 110, as a detection result of presence or absence of knocking occurrence. Next, the correlation update part 120 calculates a variation trend of a knocking occurrence frequency fk in the period from past to present, on the basis of the above CN knock-flag values $F_{knock}$ and a series of knocking detection results previously received from the knocking detection part 110. Next, the correlation update part 120 updates the correlation between the change in the ignition timing $\theta_{ig}$ and the change in the knocking occurrence frequency fk, on the basis of the current knocking occurrence frequency fk and the currently-set ignition timing $\theta_{ig}$. Further, the knocking occurrence frequency fk is calculated as a proportion of combustion cycles in which knocking occurrence is detected to total combustion cycles from past to present.

The optimum ignition timing calculation part 130 receives a latest content describing the correlation between a change in the ignition timing $\theta_{ig}$ and the knocking occurrence frequency fk as correlation describing information, from the correlation update part 120. Furthermore, the optimum ignition timing calculation part 130 receives the precombustion chamber gas flow rate Qp, the methane number MN, the intake temperature Ts, the calculation value of the air excess rate λ, and the detection value of the output torque $P_{mi}$, from the air excess rate calculation device 200 and the output detection device 300. Next, the optimum ignition timing calculation part 130 determines the ignition timing $\theta_{ig}$ of the gas engine 2 on the basis of the correlation between a change in the ignition timing $\theta_{ig}$ and a change in the knocking occurrence frequency fk described by the correlation describing information.

In an illustrative embodiment, the optimum ignition timing calculation part 130 may determine an optimum ignition timing $\theta_{ig}$ for the gas engine 2 as follows. First, the optimum ignition timing calculation part 130 estimates a variation trend of the thermal efficiency of the gas engine 2 corresponding to the change in the ignition timing $\theta_{ig}$, on the basis of the air excess rate λ, the output torque the precombustion chamber gas flow rate Qp, the intake temperature Ts, the methane number MN and the ignition timing $\theta_{ig}$ received so far from the air excess rate calculation device 200 and the output detection device 300. Next, the optimum ignition timing calculation part 130 determines the optimum ignition timing $\theta_{ig}$ taking account of the trade-off relationship between improvement of thermal efficiency of the gas engine 2 and reduction of the knocking occurrence frequency fk, on the basis of the above correlation between a change in the ignition timing $\theta_{ig}$ and a change in the knocking occurrence frequency fk and the above variation trend of the thermal efficiency.

In another alternative embodiment, the optimum ignition timing calculation part 130 may receive only the variation trend of the knocking occurrence frequency fk from past to present from the correlation update part 120. In this case, the optimum ignition timing calculation part 130 may determine a new ignition timing $\theta_{ig}$ for the gas engine 2 so as to retard the ignition timing $\theta_{ig}$ from that of the present time, if the knocking occurrence frequency fk tends to increase at the present time. In contrast, the optimum ignition timing calculation part 130 may determine a new ignition timing $\theta_{ig}$ for the gas engine 2 so as to make the ignition timing $\theta_{ig}$ earlier than that of the present time, in a case where the knocking occurrence frequency fk tends to decrease at the present time.

Finally, the optimum ignition timing calculation part 130 outputs the newly determined ignition timing $\theta_{ig}$ to the ignition timing control part 140. The ignition timing control part 140 controls the ignition timing $\theta_{ig}$ of the gas engine 2 by using the ignition timing $\theta_{ig}$ received from the optimum ignition timing calculation part 130 as a new control target value.

Subsequently, with reference to the flowchart of FIG. 2, a control flow for controlling the gas engine 2 according to some embodiments of the present invention will be described. The process of the flowchart shown in FIG. 2 starts from step S21, and the knocking detection part 110 obtains the oscillation waveform that occurs in the combustion chamber 12 due to combustion of air-fuel mixture over a single combustion cycle. This oscillation waveform is oscillation observed as a continuous waveform, the oscillation occurring as pressure waves generated by combustion of air-fuel mixture act on the inner wall surface of the combustion chamber 12 upon combustion of air-fuel mixture in the combustion chamber 12.

Figure 2:
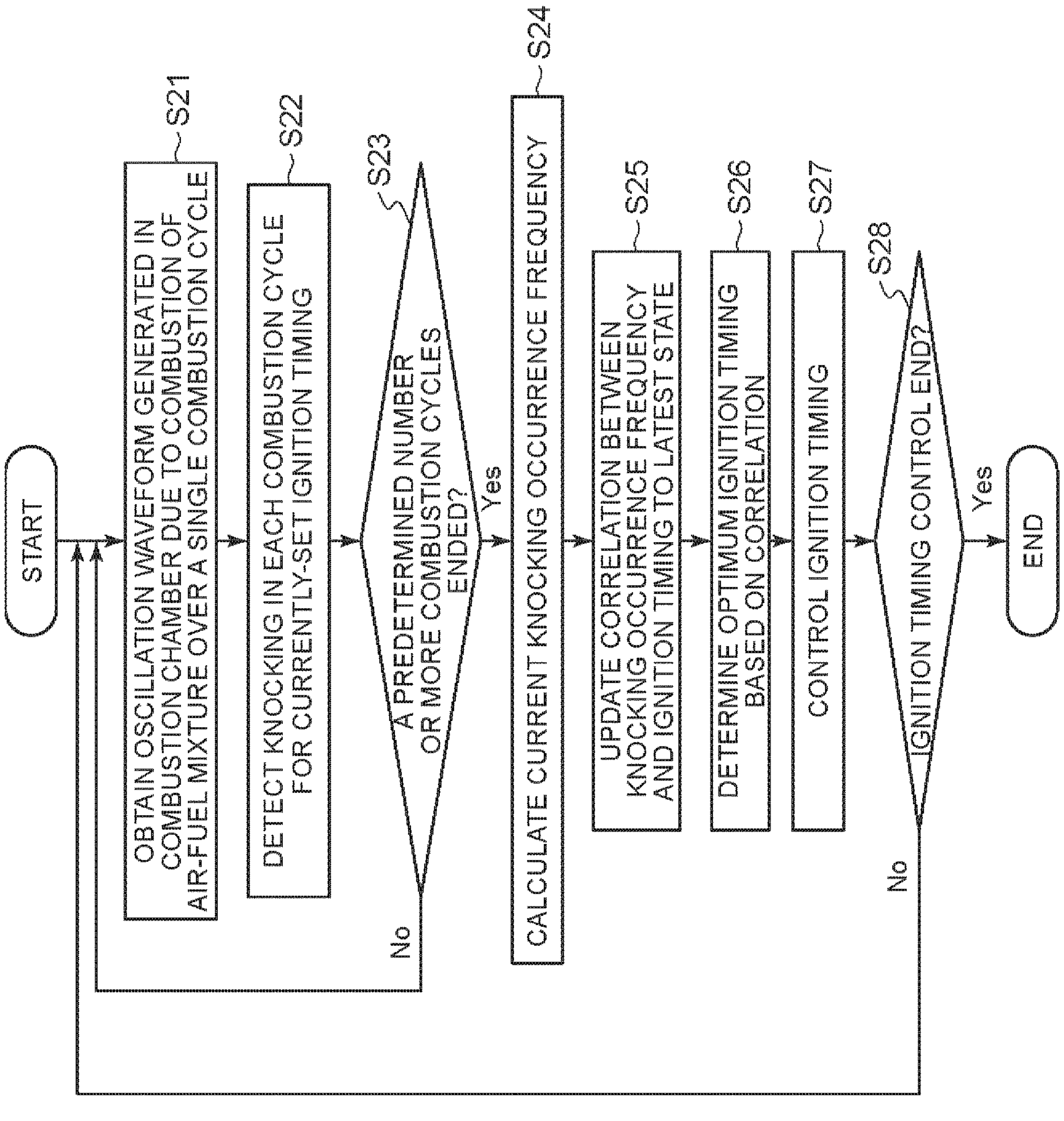
FIG. 2 is a flowchart showing a flow of a control operation of an ignition timing control system according to some embodiments of the present invention.

Next, the process of the flowchart in FIG. 2 advances to step S22, and the knocking detection part 110 detects presence or absence of knocking occurrence for the currently-set ignition timing $\theta_{ig}$, on the basis of the oscillation waveform obtained over a single combustion cycle. As a result, the knocking detection part 110 outputs a knock-flag value $F_{knock}$ as a result of detection of presence or absence of knocking occurrence over a single combustion cycle.

Next, the process of the flowchart in FIG. 2 advances to step S23, and the knocking detection part 110 determines whether presence or absence of knocking occurrence is detected, over a predetermined number CN of combustion cycles. If presence or absence of knocking occurrence is detected in less-than-CN combustion cycles, the process of the flowchart in FIG. 2 returns to step S21. Otherwise, the process advances to step S24.

In step S24 of the flowchart of FIG. 2, the correlation update part 120 receives CN knock-flag values $F_{knock}$ outputted over CN combustion cycles from the knocking detection part 110, as a detection result of presence or absence of knocking occurrence. Next, the correlation update part 120 calculates a variation trend of a knocking occurrence frequency fk in the period from past to present, on the basis of the above CN knock-flag values $F_{knock}$ and a series of knocking detection results previously received from the knocking detection part 110. Next, the process of the flowchart in FIG. 2 advances to step S25, and the correlation update part 120 updates the correlation between a change in the ignition timing $\theta_{ig}$ and a change in the knocking occurrence frequency fk to the latest state, on the basis of the current knocking occurrence frequency fk and the currently-set ignition timing $\theta_{ig}$.

Next, the process of the flow chart in FIG. 2 advances to step S26, and the optimum ignition timing calculation part 130 receives the latest content describing the correlation between a change in the ignition timing $\theta_{ig}$ and a change in the knocking occurrence frequency fk as correlation describing information, from the correlation update part 120. Next, the optimum ignition timing calculation part 130 determines the optimum ignition timing $\theta_{ig}$ of the gas engine 2 on the basis of the correlation between a change in the ignition timing $\theta_{ig}$ and a change in the knocking occurrence frequency fk described by the correlation describing information.

Next, the process of the flowchart in FIG. 2 advances to step S27, and the optimum ignition timing calculation part 130 outputs the newly determined ignition timing $\theta_{ig}$ to the ignition timing control part 140. Subsequently, the ignition timing control part 140 controls the ignition timing $\theta_{ig}$ of the gas engine by using the ignition timing $\theta_{ig}$ received from the optimum ignition timing calculation part 130 as a new control target value. Next, the process of the flowchart of FIG. 2 advances to step S28, and it is determined whether the ignition timing control operation should be ended. If it is determined that the ignition timing control operation should be ended, the execution of the flowchart in FIG. 2 is ended. If otherwise, the execution of the flowchart in FIG. 2 returns to step S21.

As described above, with the above control system 1 described with reference to FIGS. 1 and 2, it is possible to detect knocking occurrence of each combustion cycle and to control the ignition timing $\theta_{ig}$ so that the ignition timing $\theta_{ig}$ of the gas engine 2 becomes optimum, on the basis of the knocking detection result of each combustion cycle. At this time, the earlier the ignition timing in each combustion cycle is, the efficiency increases, but the risk of occurrence of knocking in a combustion chamber increases. Thus, in this embodiment, by appropriately controlling the ignition timing $\theta_{ig}$ on the basis of the trade-off relationship between improvement of efficiency of the gas engine 2 and reduction of knocking occurrence frequency, it is possible to operate the gas engine 2 as efficiently as possible while avoiding damage to the gas engine 2 due to knocking as much as possible.

Figure 4:
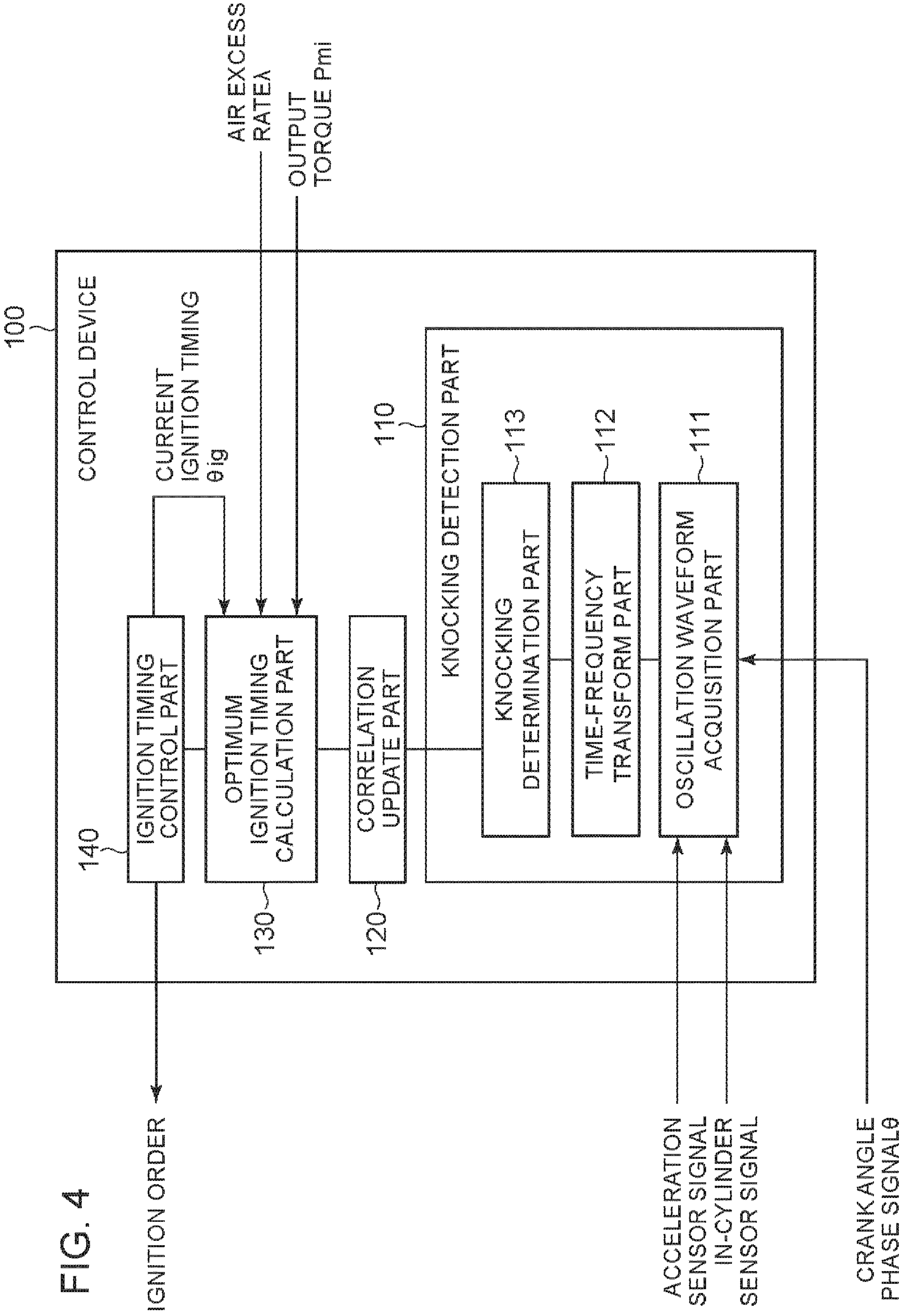
FIG. 4 is a configuration diagram of a knocking detection device according to some embodiments of the present embodiment.

Next, with reference to FIGS. 4 to 8, described is how a mechanism for accurately detecting a knocking occurrence state in the internal combustion engine with an accuracy higher than that in a typical case is realized with the knocking detection part 110 of the control system 1 of FIG. 1. FIG. 4 is a diagram for describing the specific internal configuration of the knocking detection part 110 constituting the control device 100 shown in FIG. 1. In FIG. 4, the knocking detection part 110 includes an oscillation waveform acquisition part 111, a time-frequency transform part 112, and a knocking determination part 113.

The oscillation waveform acquisition part 111 is electrically connected to the inner pressure measurement device 48 and the acceleration sensor 49 disposed on the cylinder 4 constituting the combustion chamber 12. The oscillation waveform acquisition part 111 receives a measurement value obtained by measuring variation of the inner pressure of the combustion chamber 12 from the inner pressure measurement device 48. Furthermore, the oscillation waveform acquisition part 111 receives a measurement value obtained by measuring oscillation that occurs as pressure waves due to combustion in the combustion chamber 12 act on the inner wall surface of the combustion chamber 12 as acceleration from the acceleration sensor 49. Furthermore, the oscillation waveform acquisition part 111 receives a crank angle phase signal outputted by the crank angle detector 42 to the knocking detection part 110 as a signal indicating the current crank angle phase B.

Next, the oscillation waveform acquisition part 111 receives oscillation waveform that occurs due to combustion of air-fuel mixture in the combustion chamber 12, on the basis of a measurement value of the inner pressure variation of the combustion chamber 12 received from the inner pressure measurement device 48 or a measurement value of acceleration variation received from the acceleration sensor 49. Herein, the oscillation waveform to be obtained by the oscillation waveform acquisition part 111 refers to a fine oscillation waveform observed on the inner wall surface of the combustion chamber 12 on occurrence of knocking, that is, high-frequency observed waveforms (order of kHz) including an oscillation frequency component that is unique to the time of occurrence of knocking. Acquisition of an oscillation waveform formed by combustion in the combustion chamber 12 by the oscillation waveform acquisition part 111 on the basis of the inner pressure variation in the combustion chamber 12 or the acceleration variation will be described below in detail with reference to FIGS. 5 to 7. Once the oscillation waveform is obtained, the oscillation waveform acquisition part 111 outputs oscillation waveform data representing the oscillation waveform to the time-frequency transform part 112.

The time-frequency transform part 112 receives the oscillation waveform data from the oscillation waveform acquisition part 111, and then sets the first time window TW1 and the second time window TW2 on the time axis on which the above described oscillation waveform is obtained. On the time axis, the first time window TW1 is set at a point preceding the maximum inner-pressure time at which the inner pressure of the combustion chamber 12 is at its maximum in a single combustion cycle. On the time axis, the second time window TW2 is set at a point immediately after the maximum inner-pressure time. The time windows to be set on the time axis on which the oscillation waveform is observed will be described in below in detail with reference to FIGS. 5 to 7. Next, the time-frequency transform part 112 performs time-frequency transform process of transforming each of the first waveform portion WV1 included in the first time window and the second waveform portion WV2 included in the second time window, of the oscillation waveform, to a frequency-domain expression. Finally, the time-frequency transform part 112 outputs a first transform result R1 of transforming the first waveform portion WV1 in the first time window TW1 and a second transform result R2 of transforming the second waveform portion WV2 in the second time window TW2 to the knocking determination part 113.

The knocking determination part 113 receives the above described first transform result R1 and the second transform result R2 from the time-frequency transform part 112, and sets the first frequency window FW1 and the second frequency window FW2 on the frequency axis in the frequency domain in which the first transform result R1 and the second transform result R2 are obtained. The frequency windows to be set on the frequency axis in the frequency domain in which the first transform result R1 and the second transform result R2 are obtained will be described in below in detail with reference to FIGS. 5 to 8. Next, the knocking determination part 113 extracts the first representative value P1, which is a representative value of the frequency domain expression of the first waveform portion WV1 in the first frequency window FW1. Similarly, the knocking determination part 113 extracts the second representative value P2, which is a representative value of the frequency domain expression of the second waveform portion WV2 in the second frequency window FW2. Next, the knocking determination part 113 performs a process of determining whether knocking has occurred on the basis of the relationship between the second representative value P2 and the first representative value P1.

In an illustrative embodiment, the first representative value P1 may include a first peak value at which the amplitude of the frequency domain expression of the first waveform portion WV1 is at its maximum in the first frequency window FW1. Similarly, in this embodiment, the second representative value P2 may include a second peak value at which the amplitude of the frequency domain expression of the second waveform portion WV2 is at its maximum in the second frequency window FW2. Then, in this embodiment, as a process of determining presence or absence of knocking occurrence on the basis of the relationship between the second representative value P2 and the first representative value P1, it may be determined whether knocking has occurred on the basis of the relationship between the second peak value and the first peak value.

According to this embodiment, when obtaining a representative value of the frequency domain expression, by using the peak value of a frequency spectrum curve corresponding to the frequency domain expression as a representative value, it is possible to obtain a representative value at a high speed through simple calculation. Thus, according to this embodiment, the process of determining whether knocking has occurred can be performed at a high speed with a low calculation load.

In another illustrative embodiment, the first representative value P1 may include a first partial overall (POA) value, which is a POA value calculated from the frequency domain expression of the first waveform portion WV1 in the first frequency window FW1. Similarly, in this embodiment, the second representative value P2 may include a second POA value which is a POA value calculated from the frequency domain expression of the second waveform portion WV2 in the second frequency window FW2. Then, as a process of determining presence or absence of knocking occurrence on the basis of the relationship between the second representative value P2 and the first representative value P1, it may be determined whether knocking has occurred on the basis of the relationship between the second POA value and the first POA value.

According to this embodiment, when obtaining a representative value of the frequency domain expression, a partial overall (POA) value of a frequency spectrum curve corresponding to the frequency domain expression is used as a representative value. A POA value is obtained by calculating the power spectrum of the frequency domain expression, calculating the power spectrum density on the basis of the calculated power spectrum, and calculating the square sum of the power spectrum density near the knocking frequency. Thus, when obtaining a representative value of the frequency domain expression, by using the POA calculated as described above as a representative value, it is possible to obtain a representative value taking account of all of the frequency components near the knocking frequency in the frequency domain expression. Thus, according to this embodiment, in the process of determining whether knocking has occurred, it is possible to use a representative value taking account of all of the frequency components near the knocking frequency in the frequency domain expression.

As a result of the above described series of processes performed by the oscillation waveform acquisition part 111, the time-frequency transform part 112, and the knocking determination part 113, presence or absence of knocking occurrence is detected for the current single combustion cycle. As a result, the knocking determination part 113 generates a knock-flag value $F_{knock}$ indicating presence or absence of detection of knocking occurrence in the combustion cycle. Herein, provided that CN is a predetermined number of combustion cycles, the knocking determination part 113 determines whether CN knock-flag values $F_{knock}$ are generated for respective CN combustion cycles. If only less-than-CN knock-flag values $F_{knock}$ are generated for less-than-CN combustion cycles, the knocking determination part 113 returns the execution control to the oscillation waveform acquisition part 111. Next, the oscillation waveform acquisition part 111 obtains oscillation waveform that occurs due to combustion of air-fuel mixture in the combustion chamber 12 again to start the detection process of presence or absence of knocking occurrence for the next combustion cycle.

As a result of the above series or processing operations, if the knocking determination part 113 determines that CN knock-flag values $F_{knock}$ are generated for the respective CN combustion cycles, the knocking determination part 113 outputs CN knock-flag values $F_{knock}$ generated in the respective CN combustion cycles to the correlation update part 120.

Figure 5:
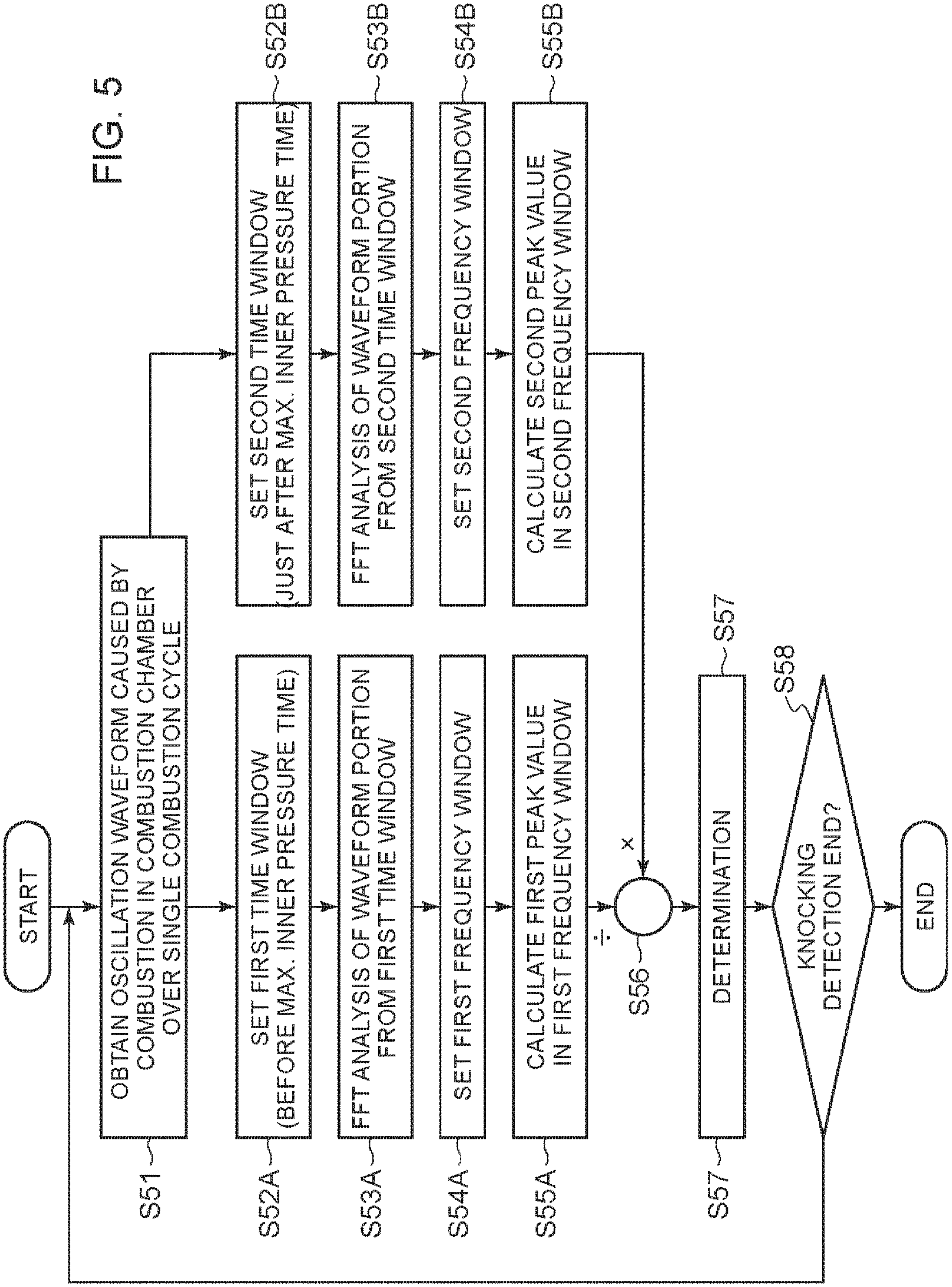
FIG. 5 is a flowchart showing a flow of knocking detection operation by a knocking detection device according to some embodiments of the present invention.

Next, with reference to FIGS. 5 to 8, a flow of a knocking detection method performed by the knocking detection part 110 shown in FIG. 4 according to some embodiments of the present invention will be described. FIG. 5 is a flowchart showing an execution process of the knocking detection method performed by the knocking detection part 110. The process of the flowchart in FIG. 5 starts from step S51. The oscillation waveform acquisition part 111 receives an oscillation waveform that occurs due to combustion of air-fuel mixture in the combustion chamber 12, on the basis of a measurement value of the inner pressure variation in the combustion chamber 12 received from the inner pressure measurement device 48 and a measurement value of acceleration variation received from the acceleration sensor 49.

In an embodiment, the oscillation waveform is extracted as a harmonic component from the inner pressure variation waveform in the combustion chamber 12 of the gas engine 2. The harmonic component is extracted as a component including an oscillation frequency component that is unique to the time of occurrence of knocking, from the inner pressure variation waveform. As a result, only by providing the inner pressure measurement device 48 having a simple configuration, such as an in-cylinder pressure sensor, in the cylinder 4 constituting the combustion chamber 12 of the gas engine 2, it is possible to obtain an oscillation waveform in the combustion chamber 12 necessary for detection of knocking, from the inner pressure variation waveform in the combustion chamber measured by the inner pressure measurement device 48. At this time, the oscillation waveform acquisition part 111 extracts an oscillation frequency component that is unique to the time of occurrence of knocking, from the measured inner pressure variation waveform. Accordingly, the oscillation waveform acquisition part 111 can extract, from the measured inner pressure variation waveform, only the frequency component excluding the basic frequency component that varies synchronously with the advancement of the combustion cycle (each stage of combustion cycle), as the oscillation frequency component unique to the time of occurrence of knocking.

In an alternative embodiment, the oscillation waveform is obtained as an acceleration detection waveform detected by the acceleration sensor 49 disposed on the cylinder 4 constituting the combustion chamber 12 in the gas engine 2. Thus, in this embodiment, only by providing the acceleration sensor 49 having a simple configuration for the cylinder 4 constituting the combustion chamber 12 of the gas engine 2, it is possible to directly obtain an oscillation waveform corresponding to the oscillation frequency component unique to the time of occurrence of knocking, from the acceleration variation waveform measured by the acceleration sensor 49.

Figure 6B:
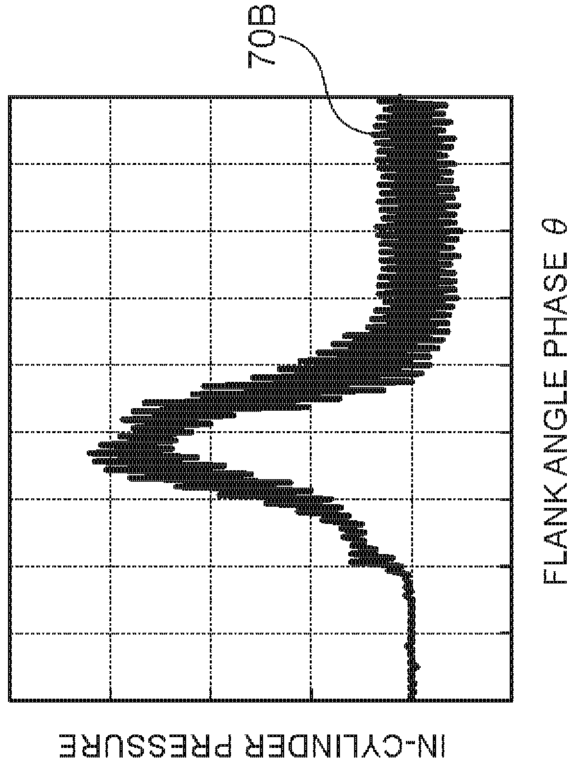
FIG. 6 is a diagram showing a fluctuation waveform of the inner pressure of the combustion chamber measured by an inner pressure measurement device disposed in the combustion chamber.
Figure 6A:
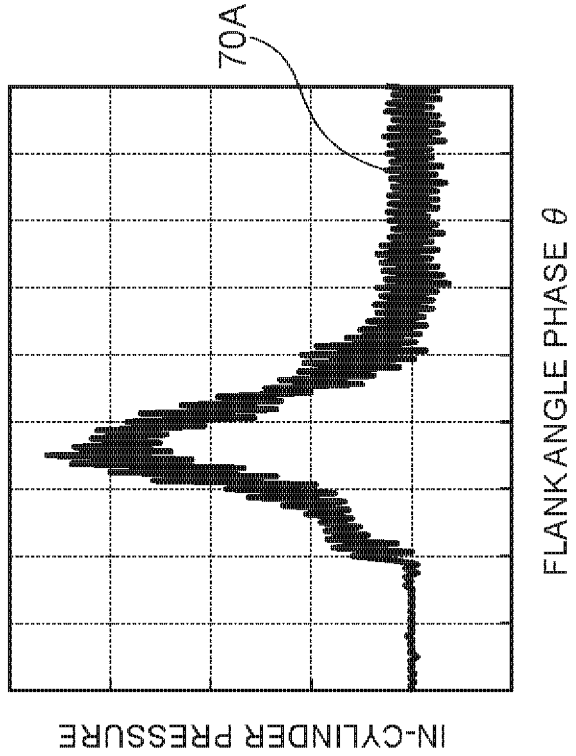

FIG. 6 shows a specific example of the fluctuation waveform of the inner pressure in the combustion chamber 12 that the oscillation waveform acquisition part Ill receives from the inner pressure measurement device 48. In each of the two-dimensional graphs shown in FIG. 6, y-axis is magnitude of pressure applied to the inner wall surface of the combustion chamber 12, and x-axis is time. Each point of time on the tame scale corresponds to a specific value of the crank angle phase θ. The graph curves 70A and 70B shown in FIGS. 6A and 6B each show a result of outputting the fluctuation waveform of the inner pressure of the combustion chamber 12 to the oscillation waveform acquisition part 111 with the inner pressure measurement device 48, under the first setting condition and the second setting condition, respectively. Herein, a condition setting specifies values to be set for the air excess ratio 2, the precombustion chamber gas flow rate Qp, the methane number MN, and the intake air temperature Ts in operation of an internal combustion engine. As can be seen from FIGS. 6A and 6B, the fluctuation waveforms 70A and 70B of the inner pressure in the combustion chamber 12 includes a basic frequency component that fluctuates synchronously with the advancement of the combustion cycle (each stage of the combustion cycle) and a high frequency component representing oscillation that is finer than the basic frequency component. Herein, the high frequency component corresponds to the oscillation waveform that is to be obtained by the oscillation waveform acquisition part 111. Specifically, the oscillation waveform to be obtained by the oscillation waveform acquisition part 111 refers to a fine oscillation waveform observed on the inner wall surface of the combustion chamber 12 on occurrence of knocking, that is, a high-frequency observed waveform including an oscillation frequency component that is unique to the time of occurrence of knocking.

Figure 7B:
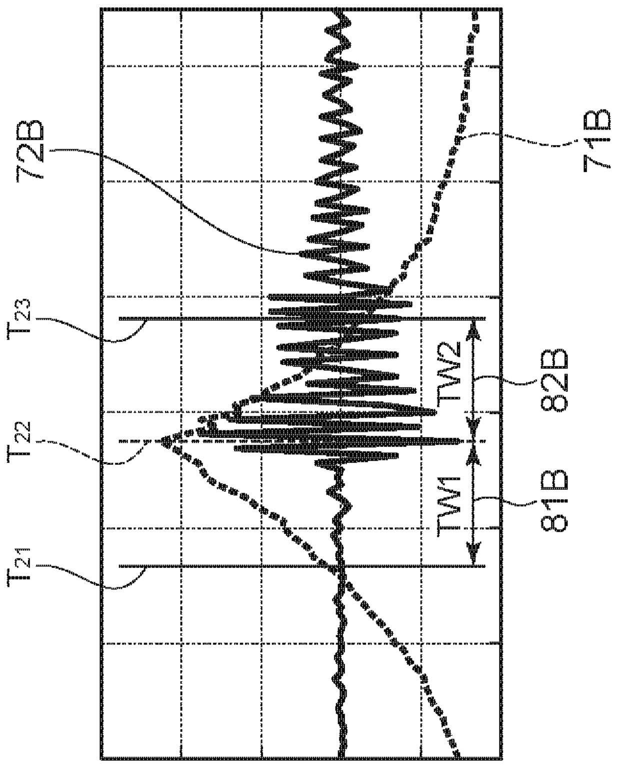
FIGS. 7A and 7B are diagrams showing two time windows set for the oscillation waveform observed in the combustion chamber, and two waveform portions extracted by the two time windows.
Figure 7A:
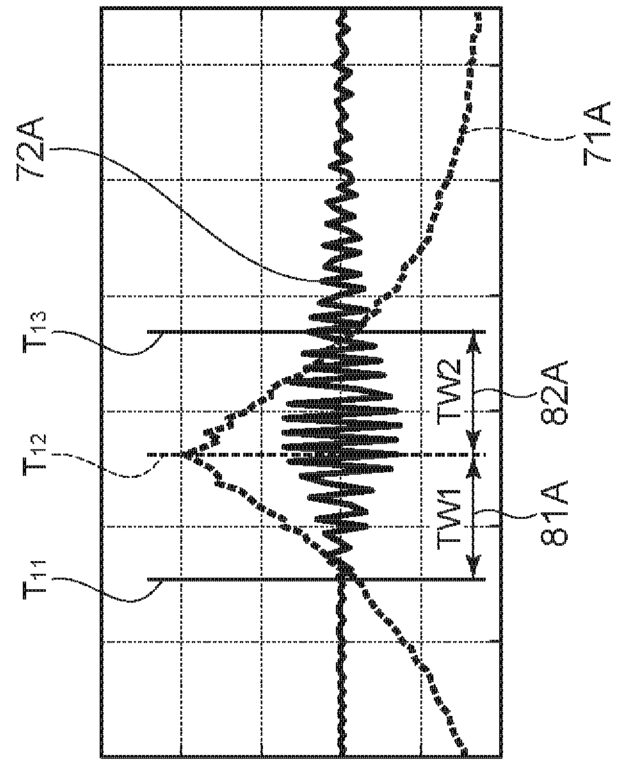

Furthermore, in each of the two-dimensional graphs shown in FIG. 7, y-axis is magnitude of pressure applied to the inner wall surface of the combustion chamber 12 (i.e., amplitude of the waveform), and x-axis is time. Each point of time on the tame scale corresponds to a specific value of the crank angle phase θ. The waveform 71A shown in FIG. 7A is a basic frequency component that varies synchronously with the advancement of the combustion cycle (each stage of combustion cycle), extracted from the inner pressure fluctuation waveform 70A shown in FIG. 6A. Furthermore, the waveform 72A shown in FIG. 7A is a component of a fine fluctuation waveform observed in the combustion chamber 12 upon occurrence of knocking, that is, a harmonic waveform component including an oscillation frequency component that is unique to the time of occurrence of knocking. That is, in a case where the gas engine 2 is operated under the same first setting condition as that in FIG. 6A, of the inner pressure fluctuation waveform shown in FIG. 6A, the high frequency waveform component corresponding to the waveform 72A shown in FIG. 7A is the oscillation waveform to be obtained by the oscillation waveform acquisition part 111.

The waveform 71B shown in FIG. 7B is a basic frequency component that varies synchronously with the advancement of the combustion cycle (each stage of combustion cycle), extracted from the inner pressure fluctuation waveform 70B shown in FIG. 6B. Furthermore, the waveform 72B shown in FIG. 7B is a component of a fine fluctuation waveform observed in the combustion chamber 12 upon occurrence of knocking, that is, a harmonic waveform component including an oscillation frequency component that is unique to the time of occurrence of knocking. That is, in a case where the gas engine 2 is operated under the same second setting condition as that in FIG. 6B, of the inner pressure fluctuation waveform shown in FIG. 6B, the high frequency waveform component corresponding to the waveform 72B shown in FIG. 7B is the oscillation waveform to be obtained by the oscillation waveform acquisition part 111. Once the oscillation waveform is obtained, the oscillation waveform acquisition part 111 outputs oscillation waveform data representing the oscillation waveform to the time-frequency transform part 112.

Next, the process of the flowchart in FIG. 5 advances to step S52A and step S52B. In step S52A, the time-frequency transform part 112 receives the oscillation waveform data from the oscillation waveform acquisition part 111, and then sets the first time window TW1 on the time axis on which the above described oscillation waveform is obtained. Further, in step S52B, the time-frequency transform part 112 sets the second time window TW2 on the time axis on which the above described oscillation waveform is obtained. On the time axis, the first time window TW1 is set at a point preceding the maximum inner-pressure time at which the inner pressure of the combustion chamber 12 is at its maximum in a single combustion cycle. On the time axis, the second time window TW2 is set at a point immediately after the maximum inner-pressure point.

Specific examples of the first time window TW1 and the second time window TW2 set by the time-frequency transform part 112 are shown in FIG. 7A as TW1 (81A) and TW2 (82A). FIG. 7A corresponds to a case where the gas engine 2 is operated under the same first setting condition as that in FIG. 6A. Furthermore, specific examples of the first time window TW1 and the second time window TW2 set by the time-frequency transform part 112 are shown in FIG. 7B as TW1 (81B) and TW2 (82B). FIG. 7B corresponds to a case where the gas engine 2 is operated under the same second setting condition as that in FIG. 6B.

Hereinafter, specific examples of the first time window TW1 (81A in FIG. 7A and 81B in FIG. 7B) and the second time window TW2 (82A in FIG. 7A and 82B in FIG. 7B) shown in FIG. 7 will be described in detail. In FIG. 7A, time $T_{12}$ represents the maximum inner pressure time when the inner pressure of the combustion chamber 12 is at its maximum in a combustion cycle. In FIG. 7A, time $T_{11}$ is a point of time preceding time $T_{12}$, which is the maximum inner pressure time, by a predetermined duration, and time $T_{13}$ is a point of time later than time $T_{12}$, which is the maximum inner pressure time, by a predetermined duration. In FIG. 7B, time $T_{22}$ represents the point of time of the maximum inner pressure time when the inner pressure of the combustion chamber 12 is at its maximum in a combustion cycle. In FIG. 7B, time $T_{21}$ is a point of time preceding time $T_{12}$, which is the maximum inner pressure time, by a predetermined duration, and time $T_{23}$ is a point of time later than time $T_{22}$, which is the maximum inner pressure time, by a predetermined duration.

That is, in FIG. 7A, the first time window TW1 (81A) in FIG. 7A is set as a time window starting from time $T_{11}$ and reaching time $T_{12}$, as a time section immediately before time $T_{12}$, which is the maximum inner pressure time. Further, the second time window TW2 (82A) in FIG. 7A is set as a time window starting from time $T_{12}$ and reaching time $T_{13}$, as a time section immediately after time $T_{12}$, which is the maximum inner pressure time. Accordingly, in FIG. 7A, the first time window TW1 (81A) and the second time window 282A are positioned so as to be adjacent to each other across time $T_{12}$, which is the maximum inner pressure time, on the time axis on which the above oscillation waveform is obtained.

In the specific example shown in FIG. 7, the point of time corresponding to the crank angle phase at which the inner pressure of the combustion chamber 12 reaches its maximum in a combustion cycle is defined as the maximum inner pressure time $T_{12}$ or $T_{22}$, setting the first time window TW1 (81 (81A, 81B)) as a time range immediately before the maximum inner pressure time, and the second time window TW2 (82) as a time range immediately after the maximum inner pressure time. Accordingly, the second time window W2 (82 (82A, 82B)) positioned in a time range immediately after the maximum inner pressure time is set so as to include only a time range with a high risk of occurrence of knocking, without omission. Furthermore, the first time window TW1 (81 (81A, 81B)) positioned in a time range immediately before the maximum inner pressure time is set so as to include only the time range with a minimum risk of occurrence of knocking. Thus, the second time window TW2 (82) (82A, 82B) and the first time window TW1 (81 (81A, 81B)) correspond to a time window corresponding to a knocking occurrence period and a time window corresponding to a period without knocking, respectively. Furthermore, in the specific example of FIG. 7, the setting range of the time window corresponding to a knocking occurrence period and the setting range of the time window corresponding to a period without knocking are selected appropriately on a reasonable basis.

In the example shown in FIG. 7, the first time window TW1 is selected so as to be positioned in a time range immediately before the maximum inner pressure time. Nevertheless, the first time window TW1 may be selected so as to be positioned in a time range preceding the maximum inner pressure time. Also in this case, the first time window TW1 positioned in a time range preceding the maximum inner pressure time can be set so as to include only the time range with a minimum risk of occurrence of knocking.

Next, the process of the flowchart in FIG. 5 advances to step S53A and step S53B. In step S53A, the time-frequency transform part 112 extracts a waveform portion included in the first time window TW1 as the first waveform portion WV1, from the oscillation waveform received from the oscillation waveform acquisition part 111. In step S53B, the time-frequency transform part 112 extracts a waveform portion included in the second time window TW2 as the second waveform portion WV2.

In an embodiment shown in FIG. 7A, the time-frequency transform part 112 extracts a waveform portion included in the first time window TW1 (81A) as the first waveform portion WV1, from the waveform 72A corresponding to the oscillation waveform received from the oscillation waveform acquisition part 111. In an embodiment shown in FIG. 7B, the time-frequency transform part 112 extracts a waveform portion included in the first time window TW1 (81B) as the first waveform portion WV1, from the waveform 72B corresponding to the oscillation waveform received from the oscillation waveform acquisition part 111.

Furthermore, in an embodiment shown in FIG. 7A, the time-frequency transform part 112 extracts a waveform portion included in the second time window TW2 (82A) as the second waveform portion WV2, from the waveform 72A corresponding to the oscillation waveform received from the oscillation waveform acquisition part 111. In an embodiment shown in FIG. 7B, the time-frequency transform part 112 extracts a waveform portion included in the second time window TW2 (82B) as the second waveform portion WV2, from the waveform 72B corresponding to the oscillation waveform received from the oscillation waveform acquisition part 111.

Next, the time-frequency transform part 112 performs a time-frequency transform process of transforming the first waveform portion WV1 cut out from the oscillation waveform received from the oscillation waveform acquisition part 111 according to the first time window TW1 from a time-domain expression to a frequency-domain expression (step S53A). Furthermore, the time-frequency transform part 112 performs a time-frequency transform process of transforming the second waveform portion WV2 cut out from the oscillation waveform received from the oscillation waveform acquisition part 111 according to the second time window TW2 from a time-domain expression to a frequency-domain expression (step S53B).

In an illustrative embodiment, the transform of the first waveform portion WV1 or the second waveform portion WV2 from a time-domain expression to a frequency domain expression includes a process of transforming a time-series sample of the first waveform portion WV1 or the second waveform portion WV2 into a set including amplitudes of the respectively sampling frequencies, through a fast Fourier transform (FFT analysis). Thus, in this embodiment, it is possible to provide a plurality of (K) converters corresponding to a plurality of (K) sampling frequencies on the frequency axis, and to perform the calculation process of discrete Fourier transform on a plurality of time-series samples in parallel by using the plurality of (K) converters of parallel configuration. As a result, it is possible to perform fast transform of the first waveform portion WV1 or the second waveform portion WV2 to the frequency domain expression. Accordingly, even in a case where the rotation speed of the crank shaft is extremely high and it is necessary to detect occurrence of knocking in an extremely short period of time for each combustion cycle, it is possible to perform the frequency domain transform for the first waveform portion WV1 or the second waveform portion WV2 with a high speed in such detection.

Finally, the time-frequency transform part 112 outputs a first transform result R1 of transforming the first waveform portion WV1 in the first time window TW1 into a frequency domain expression through the time-frequency transform (e.g. FFT analysis), to the knocking determination part 113 (step S53A). Furthermore, the time-frequency transform part 112 outputs a second transform result R2 of transforming the second waveform portion WV2 in the second time window TW2 into a frequency domain expression through the time-frequency transform (e.g. FFT analysis), to the knocking determination part 113 (step S53B).

Next, the process of the flowchart in FIG. 5 advances to step S54A and step S54B. In step S54A, the knocking determination part 113 having received the above described first transform result R1 from the time-frequency transform part 112 sets the first frequency window FW1 on the frequency axis in the frequency domain in which the first transform result R1 is obtained. Furthermore, in step S54B, the knocking determination part 113 having received the above described second transform result R2 from the time-frequency transform part 112 sets the second frequency window FW2 on the frequency axis in the frequency domain in which the second transform result R2 is obtained.

Figure 8A:
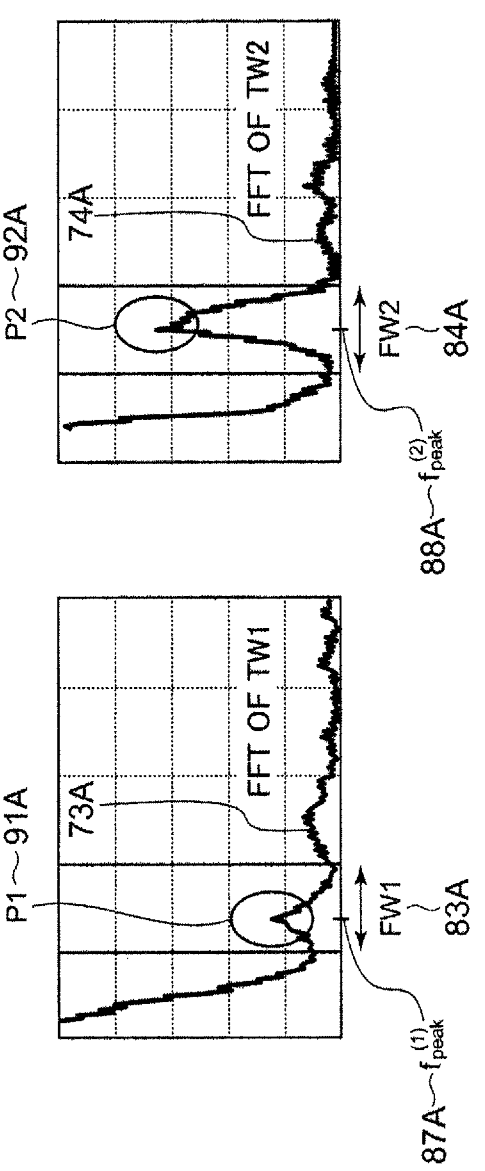
FIGS. 8A and 8B are diagrams showing a FFT analysis result obtained by fast Fourier transform of two waveform portions extracted by the two time windows, and two frequency windows.

Specific examples of the first frequency window FW1 and the second frequency window FW2 set by the knocking determination part 113 are shown in FIG. 8A as FW1 (83A) and FW2 (84A). FIG. 8A corresponds to a case where the gas engine 2 is operated under the same first setting condition as that in FIG. 6A. In each of the two dimensional graphs shown in FIG. 8A, x-axis is a frequency scale in the physical unit of kHz, and y-axis is amplitude (strength) at a particular frequency. Furthermore, the frequency spectrum curve 73A shown in FIG. 8A is a frequency spectrum obtained by transforming the first waveform portion WV1 cut out from the oscillation waveform 72A according to the first time window TW1 (81A) in FIG. 7A from a time domain to a frequency domain through the time-frequency transform. Furthermore, the frequency spectrum curve 74A shown in FIG. 8A is a frequency spectrum obtained by transforming the second waveform portion WV2 cut out from the oscillation waveform 72A according to the first time window TW2 (82A) in FIG. 7A from a time domain to a frequency domain through the time-frequency transform. In FIG. 8A, the first frequency window FW1 (83A) is set on the frequency axis as a frequency range for partially cutting out the frequency spectrum curve 73A. In FIG. 8A, the second frequency window FW2 (84A) is set on the frequency axis as a frequency range for partially cutting out the frequency spectrum curve 74A.

Figure 8B:
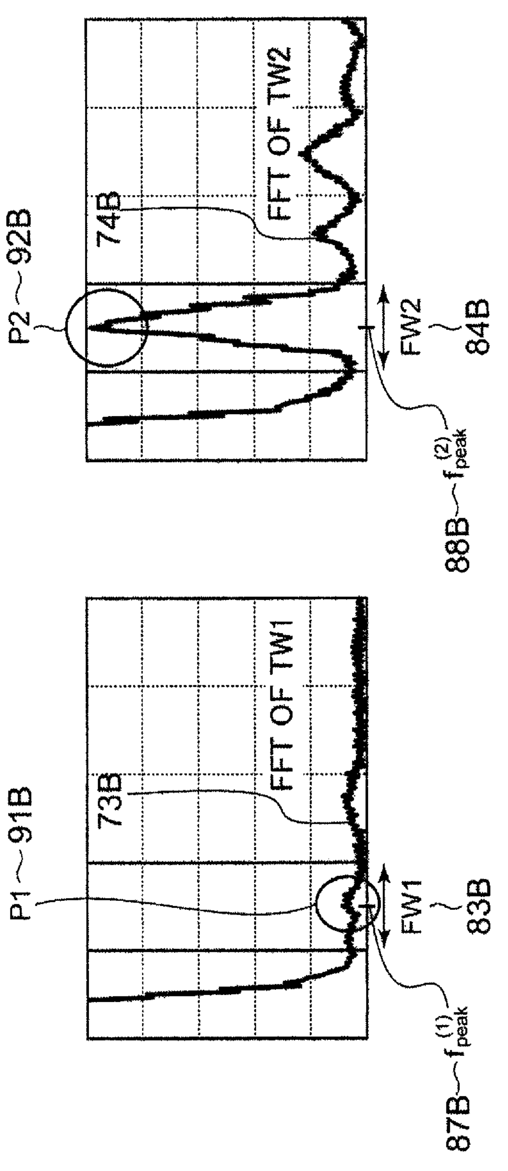

Furthermore, specific examples of the first frequency window FW1 and the second frequency window FW2 set by the knocking determination part 113 are shown in FIG. 8B as FW1 (83B) and FW2 (84B). FIG. 8B corresponds to a case where the gas engine 2 is operated under the same first setting condition as that in FIG. 6B. In each of the two dimensional graphs shown in FIG. 8B, x-axis is a frequency scale in the physical unit of kHz, and y-axis is amplitude (strength) at a particular frequency. The frequency spectrum curve 73B shown in FIG. 8B is a frequency spectrum obtained by transforming the first waveform portion WV1 cut out from the oscillation waveform 72B according to the first time window TW1 (81B) in FIG. 7B from a time domain to a frequency domain through the time-frequency transform. The frequency spectrum curve 74B shown in FIG. 8B is a frequency spectrum obtained by transforming the second waveform portion WV2 cut out from the oscillation waveform 72B according to the first time window TW2 (82B) in FIG. 7B from a time domain to a frequency domain through the time-frequency transform. In FIG. 8B, the first frequency window FW1 (83B) is set on the frequency axis as a frequency range for partially cutting out the frequency spectrum curve 73B. In FIG. 8B, the second frequency window FW2 (84B) is set on the frequency axis as a frequency range for partially cutting out the frequency spectrum curve 74B.

Next, the process of the flowchart in FIG. 5 advances to step S55A and step S55B. In step S55A, the knocking determination part 113 calculates the first representative value P1, which is a representative value of the frequency domain expression of the first waveform portion WV1 in the first frequency window FW1. For instance, according to an illustrative embodiment, in step S55A, the knocking determination part 113 may extract, as the first representative value P1, a first peak value P1 at which the amplitude of the frequency domain expression of the first waveform portion WV1 is at its maximum in the first frequency window FW1. Further, in another illustrative embodiment, in step S55A, the knocking determination part 113 may extract, as the first representative value P1, a first POA value P1, which is a POA value calculated from the frequency domain expression of the first waveform portion WV1 in the first frequency window FW1.

Similarly, in step S55B, the knocking determination part 113 calculates the second representative value P2, which is a representative value of the frequency domain expression of the second waveform portion WV2 in the second frequency window FW2. For instance, according to an illustrative embodiment, in step S55B, the knocking determination part 113 may extract, as the second representative value P2, a second peak value P2 at which the amplitude of the frequency domain expression of the second waveform portion WV2 is at its maximum in the second frequency window FW2. Further, in another illustrative embodiment, in step S55B, the knocking determination part 113 may extract, as the second representative value P2, a second POA value P2, which is a POA value calculated from the frequency domain expression of the second waveform portion WV2 in the second frequency window FW2.

In the embodiment described below, to simplify the description, the first representative value P1 and the second representative value P2 are assumed to be calculated as the first peak value P1 and the second peak value P2 at which the amplitude of the above described frequency domain expression is at its maximum. Nevertheless, some embodiments described below can be implemented similarly even if the first representative value P1 and the second representative value P2 are calculated as the first POA value P1 and the second POA value P2 obtained as POA values from the frequency domain expression described above.

In an embodiment shown in FIG. 8A, the frequency domain expression of the first waveform portion WV1 is expressed as the frequency spectrum curve 73A. Thus, in an embodiment shown in FIG. 8A, the knocking determination part 113 extracts the peak frequency $f_{peak}^{(1)}$ (87A) at which the frequency spectrum curve is at a peak value within the first frequency window FW1 (83A), and the amplitude P1 (91A) thereof (step S55A). The extracted amplitude P1 (91A) of the peak frequency $f_{peak}^{(1)}$ (87A) is the first peak value P1 (91A) in the example shown in FIG. 8A. Furthermore, in an embodiment shown in FIG. 8A, the frequency domain expression of the second waveform portion WV2 is expressed as the frequency spectrum curve 74A. Thus, in an embodiment shown in FIG. 8A, the knocking determination part 113 extracts the peak frequency $f_{peak}^{(2)}$ (88A) at which the frequency spectrum curve 74A is at a peak value within the second frequency window FW2 (84A), and the amplitude P2 (92A) thereof (step S55B). The extracted amplitude P2 (92A) of the peak frequency $f_{peak}^{(2)}$ (88A) is the second peak value P2 (92A) in the example shown in FIG. 8A. That is, the first peak value P1 (91A) is a local maximum value at which the frequency spectrum curve 73A is at its peak within the first frequency window FW1 (83A). Furthermore, the second peak value P2 (92A) is a local maximum value at which the frequency spectrum curve 74A is at its peak within the second frequency window FW2 (84A).

In an embodiment shown in FIG. 8B, the frequency domain expression of the first waveform portion WV1 is expressed as the frequency spectrum curve 73B. Thus, in an embodiment shown in FIG. 8B, the knocking determination part 113 extracts the peak frequency $f_{peak}^{(1)}$ (87B) at which the frequency spectrum curve 73B is at a peak value within the first frequency window FW1 (83B), and the amplitude P1 (91B) thereof (step S55A). The extracted amplitude P1 (91B) of the peak frequency $f_{peak}^{(1)}$ (87B) extracted is the first peak value P1 (91B) in the example shown in FIG. 8B. Furthermore, in an embodiment shown in FIG. 8B, the frequency domain expression of the second waveform portion WV2 is expressed as the frequency spectrum curve 74B. Thus, in an embodiment shown in FIG. 8B, the knocking determination part 113 extracts the peak frequency $f_{peak}^{(2)}$ (88B) at which the frequency spectrum curve 74B is at a peak value, within the second frequency window FW2 (84B), and the amplitude P2 (92B) thereof (step S55B). The extracted amplitude P2 (92B) of the peak frequency $f_{peak}^{(2)}$ (88B) is the second peak value P2 (92B) in the example shown in FIG. 8B. That is, the first peak value P1 (91B) is a local maximum value at which the frequency spectrum curve 73B is at its peak within the first frequency window FW1 (83B). Furthermore, the second peak value P2 (92B) is a local maximum value at which the frequency spectrum curve 74B is at its peak within the second frequency window FW2 (84B).

Next, the process of the flowchart in FIG. 5 advances to step S56 and step S57. In step S56 and step S57, the knocking determination part 113 performs a process of determining whether knocking has occurred, on the basis of the relationship between the first peak value P1 and the second peak value P2, respectively extracted from the first frequency window FW1 and the second frequency window FW2. In the embodiment shown in FIG. 8, the first peak value P1 and the second peak value P2 correspond to the first peak value P1 (91 (91A, 91B)) and the second peak value P2 (92 (92A, 92B)). The first peak value P1 (91 (91A, 91B)) is a local maximum value at which the frequency spectrum curve 73 (73A, 73B) is at its peak within the first frequency window FW1 (83 (83A, 83B)). The second peak value P2 (92 (92A, 92B)) is a local maximum value at which the frequency spectrum curve 74 (74A, 74B) is at its peak within the first frequency window FW2 (84 (84A, 84B)). Accordingly, in the embodiment shown in FIG. 8, the knocking determination part 113 performs a process of determining whether knocking has occurred on the basis of the relationship between the first peak value P1 (91) and the second peak value P2 (92), respectively extracted from the first frequency window FW1 (83) and the second frequency window FW2 (84).

In an illustrative embodiment, in step S56, the knocking determination part 113 divides the second peak value P2 by the first peak value P1 to obtain a peak ratio (P2/P1), and in step S57, performs the process of determining that knocking has occurred only if the peak ratio (P2/P1) is greater than a predetermined threshold. For instance, in step S56 shown in FIG. 8, the knocking determination part 113 obtains the peak ratio (P2/P1) by dividing the second peak value P2 (92) extracted from the second frequency window FW2 (84) by the first peak value P1 (91) extracted from the first frequency window FW1 (83). Next, in step S57, the knocking determination part 113 performs the process of determining that knocking has occurred only if the peak ratio is greater than a predetermined threshold α (peak ratio>α). In this embodiment, in step S57, the knocking determination part 113 sets 'knock-flag $F_{knock}$=1' if it is determined that knocking has occurred, and sets 'knock-flag $F_{knock}$=0' if it is determined that knocking is not occurring.

Next, the process of the flowchart in FIG. 5 advances to step S58. In step S57, provided that a predetermined number of combustion cycles is CN, the knocking determination part 113 determines whether CN knock-flag values $F_{knock}$ are generated for respective CN combustion cycles. If less-than-CN knock-flag values $F_{knock}$ are generated for less-than-CN combustion cycles, execution of the flowchart in FIG. 5 returns to step S51, and the knocking determination part 113 returns the execution control to the oscillation waveform acquisition part 111. In step S57, if the knocking determination part 113 determines that CN knock-flag values $F_{knock}$ are generated for respective CN combustion cycles, the knocking determination part 113 outputs CN knock-flag values $F_{knock}$ generated in the respective CN combustion cycles to the correlation update part 120, and the flowchart in FIG. 5 is ended.

As a result of execution of the flowchart in FIG. 5, the correlation update part 120 receives CN knock-flag values $F_{knock}$ outputted over CN combustion cycles from the knocking detection part 110, as a detection result of presence or absence of knocking occurrence. Next, the correlation update part 120 calculates a variation trend of a knocking occurrence frequency fk in the period from past to present, on the basis of the above CN knock-flag values $F_{knock}$ and a series of knocking detection results previously received from the knocking detection part 110. Further, the knocking occurrence frequency fk is calculated as a proportion of combustion cycles in which knocking occurrence is detected to total combustion cycles from past to present.

Accordingly, in the knocking detection method described above with reference to FIGS. 4 to 8, the point of time corresponding to the crank angle phase at which the inner pressure of the combustion chamber reaches its maximum in a combustion cycle is defined as the maximum inner pressure time, setting the first time window TW1 (81) as a time range preceding the maximum inner pressure time. Furthermore, in this knocking detection method, the second time window TW2 is set as a time range immediately after the maximum inner pressure time. Accordingly, the second time window TW2 positioned immediately after the maximum inner pressure time is set so as to include only a time range with a high risk of occurrence of knocking, without omission. Furthermore, the first time window TW1 positioned in a time range preceding the maximum inner pressure time is set so as to include only the time range with a minimum risk of occurrence of knocking. Thus, the second time window TW2 and the first time window TW1 correspond to a time window corresponding to a knocking occurrence period and a time window corresponding to a period without knocking, respectively. Furthermore, according to the above knocking detection method, the setting range of the time window corresponding to a knocking occurrence period and the setting range of the time window corresponding to a period without knocking are selected appropriately on a reasonable basis.

In addition, in the above knocking detection method, the risk of occurrence of knocking is evaluated on the basis of two peak values P1 and P2 obtained from the frequency domain expressions of two respective waveform portions WV1 and WV2 included in the second time window TW2 and the first time window TW1, respectively, from the oscillation waveform generated by combustion of air-fuel mixture. As a result, with this knocking detection method, it is possible to evaluate the risk of occurrence of knocking while relatively comparing a peak value of the frequency spectrum obtained from the oscillation waveform in a knocking occurrence period to a peak value of the frequency spectrum obtained from the oscillation waveform in a period without knocking. Therefore, according to the above knocking detection method, the setting range of the time window corresponding to a knocking occurrence period and the setting range of the time window corresponding to a period without knocking are selected appropriately on a reasonable basis, and thereby it is possible to detect knocking with a higher accuracy.

Furthermore, in an illustrative embodiment, the combustion chamber 12 includes a precombustion chamber 12*a* with a built-in ignition plug and a main chamber 12*b* in communication with the precombustion chamber 12*a* through a nozzle hole 12*c*. In this embodiment, the first time window TW1 may be set as follows. That is, the first time window TW1 may be set so as to include an ignition timing of the ignition plug inside the precombustion chamber 12*a*, in each combustion cycle of the gas engine 2. Herein, on ignition of the precombustion chamber 12*a*, only a small amount of fuel gas for producing a torch exists, and is directly ignited by the ignition plug. Thus, the risk of knocking due to abnormal combustion is extremely low. In addition, on ignition of the precombustion chamber 12*a*, it is possible to observe the oscillation waveform due to combustion of air-fuel mixture while knocking is not occurring. Accordingly, in this embodiment, it is possible to evaluate the risk of occurrence of knocking even more accurately, by comparing the peak values P1 and P2 of two frequency spectra obtained from two waveform portions included in the first time window TW1 including the ignition timing of the precombustion chamber 12*a* and the second time window TW2 corresponding to a knocking period, respectively.

Furthermore, in an illustrative embodiment, the first frequency window FW1 and the second frequency window FW2 may be selected so as to include a frequency component that appears as a peak frequency, from among frequency components of the impact wave generated in the combustion chamber 12 due to occurrence of knocking. As a result, the peak value of the frequency spectrum obtained from the oscillation waveform in a knocking occurrence period and the peak value of the frequency spectrum obtained from the oscillation waveform in a period without knocking are extracted from a vicinity frequency range surrounding the peak frequency unique to the time of occurrence of knocking. Furthermore, the peak value of the frequency spectrum obtained from the oscillation waveform in a knocking occurrence period and the peak value of the frequency spectrum obtained from the oscillation waveform in a period without knocking are extracted from a common peak vicinity frequency range. As a result, in this embodiment, it is possible to evaluate the risk of occurrence of knocking even more accurately, by relatively comparing a peak value of the frequency spectrum obtained from the oscillation waveform in a knocking occurrence period to a peak value of the frequency spectrum obtained from the oscillation waveform in a period without knocking.

Next, with reference to FIG. 9, discussed is how the knocking index calculated according to the knocking detection method described above with reference to FIGS. 4 to 8 is improved compared to a typical knocking evaluation index. Specifically, knocking severity is used as an example of typical knocking evaluation index. With reference to the evaluation data in FIG. 9, the advantage of the peak ratio will be described, which is calculated as a ratio of the second peak value P2 to the first peak value P1 according to an embodiment of the present invention, as an index indicating the risk of occurrence of knocking, as compared to knocking severity.

Figure 9B:
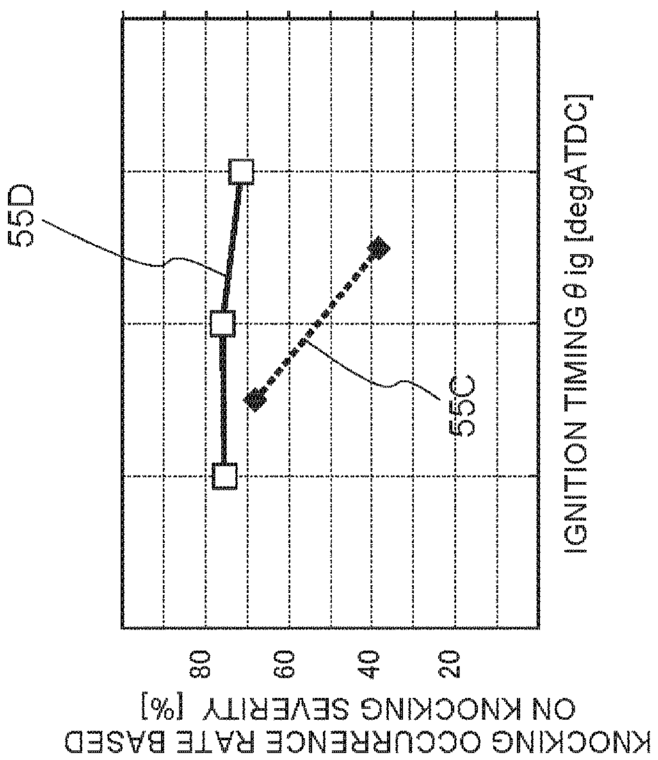
FIG. 9 are diagrams showing a result of evaluation of a change in the knocking occurrence frequency with respect to advancement of the crank phase angle according to some embodiments of the present invention, and a result of evaluation based on knocking severity.
Figure 9A:
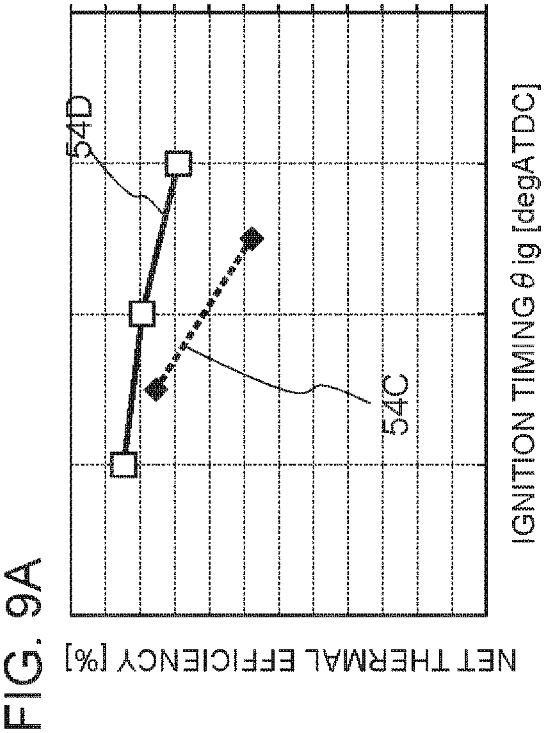

The two curves 54C and 54D shown in FIG. 9A indicate the variation of the thermal efficiency with respect to a change in the ignition timing $\theta_{ig}$ of the internal combustion engine in a test operation of the gas engine 2 under two different condition settings (the third condition setting and the fourth condition setting), which are different from the case in FIG. 3. Herein, a condition setting specifies values to be set for the air excess ratio λ, the precombustion chamber gas flow rate Qp, the methane number MN, and the intake air temperature Ts in a test operation of the gas engine 2. That is, the thermal efficiency variation curve 54A plotted by triangular marks and the thermal efficiency variation curve 54B plotted by round marks in FIG. 3A are curves obtained by setting two different values for the air excess ratio λ, the precombustion chamber gas flow rate Qp, the methane number MN, and the intake air temperature Ts in a test operation of the gas engine 2, as the third condition setting and the fourth condition setting.

Figure 9C:
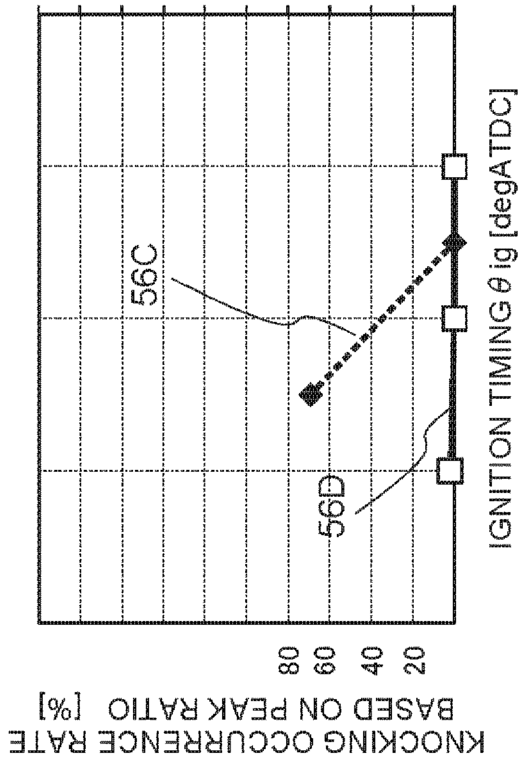

Furthermore, in the case shown in FIG. 9, in the curve graph of FIG. 9B and the graph curve of FIG. 9C, y-axis is the knocking occurrence frequency, which corresponds to a ratio of combustion cycles with knocking occurrence. The two curves 55C and 55D plotted in FIG. 9B are curve graphs obtained under the same two condition settings (the third condition setting and the fourth condition setting) as those shown in FIG. 9A. Specifically, the two curves 55C and 55D indicate the variation of the knocking occurrence frequency calculated on the basis of knocking severity in response to a change in the ignition timing $\theta_{ig}$ of the gas engine 2 in a test operation of the gas engine 2. Furthermore, the two curves 56C and 56D plotted in FIG. 9C are curve graphs obtained under the same two condition settings (the third condition setting and the fourth condition setting) as those shown in FIG. 9A. Specifically, the curves 56C and 56D indicate the variation of the knocking occurrence frequency calculated on the basis of a peak ratio obtained by dividing the second peak value P2 by the first peak value P1 in step S56 of FIG. 5, with respect to a change in the ignition timing $\theta_{ig}$ of the internal combustion engine in a test operation of the gas engine 2.

The following can be understood from comparison of the variation curve (55C in FIG. 9B) of knocking occurrence frequency shown as a function of the ignition timing $\theta_{ig}$ under the third condition setting and the variation curve (55D in FIG. 9B) of knocking occurrence frequency shown as a function of the ignition timing $\theta_{ig}$ under the fourth condition setting in FIG. 9B. That is, although the condition setting is different for the variation curve 55C and the variation curve 55D in FIG. 9B, there is no remarkable difference in the knocking occurrence frequency. This is substantially similar in a case where the air excess rate λ, the precombustion chamber gas flow rate Qp, the methane number MN, and the intake temperature Ts included in the setting items of the condition setting are considerably varied. In contrast, the following can be understood from comparison of the variation curve (56C in FIG. 9B) of knocking occurrence frequency shown as a function of the ignition timing $\theta_{ig}$ under the third condition setting and the variation curve (55D in FIG. 9B) of knocking occurrence frequency shown as a function of the ignition timing $\theta_{ig}$ under the fourth condition setting in FIG. 9C. That is, for the condition setting is varied between the variation curve 56C and the variation curve 56D in FIG. 9C, there is a clear significant difference in the knocking occurrence frequency.

That is, the variation curve of knocking occurrence frequency obtained as a function of the ignition timing $\theta_{ig}$ on the basis of knocking severity does not show a significant difference in the transition of the knocking occurrence rate even when the condition setting is changed considerably. In contrast, the variation curve of knocking occurrence frequency obtained as a function of the ignition timing $\theta_{ig}$ according to an embodiment of the present invention shows a significant difference in the transition of the knocking occurrence rate by changing the condition setting.

Furthermore, the following can be understood from comparison of the variation curve (54C in FIG. 9A) of thermal efficiency shown as a function of the ignition timing $\theta_{ig}$ under the third condition setting, the variation curve (55C in FIG. 9B) of knocking occurrence frequency obtained from knocking severity, and the variation curve (56C in FIG. 9B) of knocking occurrence frequency obtained from a peak ratio according to an embodiment of the present invention. That is, while the thermal efficiency decreases gradually and slightly with retard in the ignition timing $\theta_{ig}$, knocking occurrence rate obtained from knocking severity continues to be at a high value. The transition of the knocking occurrence rate is unnaturally high in view of the actually-observed knocking occurrence frequency. In contrast, while the thermal efficiency decreases gradually and slightly with retard in the ignition timing $\theta_{ig}$, the knocking occurrence rate obtained from a peak ratio according to an embodiment of the present invention continues to be at a low value, which is not unnatural in view of the actually-observed knocking occurrence rate.

Furthermore, the following can be understood from comparison of the variation curve (54D in FIG. 9A) of thermal efficiency shown as a function of the ignition timing $\theta_{ig}$ under the fourth condition setting, the variation curve (55D in FIG. 9B) of knocking occurrence frequency obtained from knocking severity, and the variation curve (56D in FIG. 9B) of knocking occurrence frequency obtained according to an embodiment of the present invention. That is, while the thermal efficiency decreases with retard in the ignition timing $\theta_{ig}$, the knocking occurrence rate obtained from knocking severity also decreases, but the transition of the knocking occurrence rate herein is still unnaturally high, in view of the actually-observed knocking occurrence frequency. In contrast, while the thermal efficiency decreases with retard in the ignition timing $\theta_{ig}$, the knocking occurrence rate obtained from a peak ratio according to an embodiment of the present invention tends to decrease while remaining in a low value range, which is not unnatural in view of the actually-observed knocking occurrence rate.

As described above, by using the peak ratio calculated as a ratio of the first peak value P1 to the second peak value P2 according to an embodiment of the present invention as a knocking evaluation index, it is possible to detect occurrence of knocking with a higher accuracy than a typical knocking evaluation index. This is because, unlike the case in which knocking occurrence is detected on the basis of a typical knocking evaluation index, the knocking occurrence risk is evaluated on the peak ratio described as follows in an embodiment of the present invention. That is, according to an embodiment of the present invention, time-frequency transform (FFT analysis) is performed with two time windows provided in a time period of a single combustion cycle, and a peak ratio is obtained from two frequency spectra obtained therefrom. Furthermore, by evaluating presence or absence of knocking on the basis of a peak ratio according to an embodiment of the present invention, it is possible to evaluate a general trend of knocking with respect to the ignition timing. Furthermore, by evaluating presence or absence of knocking on the basis of a peak ratio according to an embodiment of the present invention, it is possible to detect a knocking occurrence trend which is substantially equal to the trend of non-continuous heat generation in the vicinity of the maximum inner pressure time in the combustion chamber 12 that can be observed at the time of occurrence of knocking.

DESCRIPTION OF REFERENCE NUMERALS

1 Control system
2 Gas engine
4 Cylinder
6 Piston
8 Crank
10 Crank shaft
12 Combustion chamber
12*a* Precombustion chamber
12*b* Main chamber
12*c* Nozzle hole
14 Air supply pipe
16 Intake pipe
18 Air supply valve
20 Exhaust pipe
22 Exhaust valve
24 Mixer
26 Fuel supply pipe
28 Fuel adjustment valve
30 Ignition plug
42 Crank angle detector
44 Generator
46 Torque sensor
48 Inner pressure measurement device
49 Acceleration sensor
54 (54A, 54B, 54C, 54D) Variation curve of thermal efficiency
55 (55A, 55B, 55C, 55D Variation curve of knocking occurrence rate
56 (56C, 56D) Variation curve of knocking occurrence rate
70A, 70B Inner pressure variation curve
71 (71A, 71B) Basic frequency component
72 (72A, 72B) Oscillation waveform
73 (73A, 73B) Frequency spectrum curve
74 (74A, 74B) Frequency spectrum curve
100 Control device
110 Knocking detection part
111 Oscillation waveform acquisition part
112 Time-frequency transform part
113 Knocking determination part
120 Correlation update part
130 Optimum ignition timing calculation part
140 Ignition timing control part
200 Air excess rate calculation device
210 Fuel amount detector
220 Air amount detector
230 Fuel calorie detector
300 Output detection device
CN Number of combustion cycle
FW1 First frequency window
FW2 Second frequency window
$F_{knock}$ Knock-flag value
MN Methane number
P1 First peak value
P2 Second peak value
$P_{mi}$ Output torque
Qp Precombustion chamber gas flow rate
R1 First transform result
R2 Second transform result
TW1 First time window
TW2 Second time window
Ts Intake air temperature
WV1 First waveform portion
WV2 Second waveform portion
fk Knocking occurrence frequency
fpeak Peak frequency

The invention claimed is:

1. A knocking detection method of detecting occurrence of knocking in a combustion chamber of an internal combustion engine, the method comprising:
- a step of obtaining an oscillation waveform generated by combustion of air-fuel mixture in the combustion chamber;
- a step of setting a first time window preceding a maximum inner pressure time at which an inner pressure of the combustion chamber is at maximum in a single combustion cycle and a second time window immediately after the maximum inner pressure time, and transforming each of a first waveform portion included in the first time window and a second waveform portion included in the second time window into an expression-domain expression, of the oscillation waveform; and
- a step of setting a first frequency window and a second frequency window, calculating a first representative value which is a representative value of the frequency domain expression of the first waveform portion in the first frequency window and a second representative value which is a representative value of the frequency domain expression of the second waveform portion in the second frequency window, and determining whether knocking has occurred on the basis of a relationship between the second representative value and the first representative value.

2. The knocking detection method according to claim 1,
- wherein the first representative value includes a first peak value at which an amplitude of the frequency domain expression of the first waveform portion is at maximum in the first frequency window,
- wherein the second representative value includes a second peak value at which an amplitude of the frequency domain expression of the second waveform portion is at maximum in the second frequency window, and
- wherein the step of determining whether knocking has occurred includes determining whether knocking has occurred on the basis of a relationship between the second peak value and the first peak value.

3. The knocking detection method according to claim 1, wherein the first representative value includes a first partial overall (POA) value which is a POA value calculated from the frequency domain expression of the first waveform portion in the first frequency window, wherein the second representative value includes a second POA value which is a POA value calculated from the frequency domain expression of the second waveform portion in the second frequency window, wherein the step of determining whether knocking has occurred includes determining whether knocking has occurred on the basis of a relationship between the second POA value and the first POA value.

4. The knocking detection method according to claim 1, wherein the first frequency window and the second frequency window are selected so as to include a frequency component which appears as a peak frequency, of a frequency component of an impact wave generated in the combustion chamber due to knocking occurrence.

5. The knocking detection method according to claim 1, wherein the combustion chamber further comprises a precombustion chamber including an ignition plug disposed therein, and a main chamber in communication with the precombustion chamber via a nozzle hole, and wherein, in each combustion cycle of the internal combustion engine, the first window is set so as to include an ignition timing of the ignition plug.

6. The knocking detection method according to claim 1, wherein transform of the first waveform portion or the second waveform portion into the frequency domain expression includes a process of transforming a time-series sample of the first waveform portion or the second waveform portion into a set including an amplitude value of each sampling frequency by fast Fourier transform (FFT).

7. The knocking detection method according to claim 1, wherein a cylinder constituting the combustion chamber in the internal combustion engine includes an inner pressure measurement device configured to measure and output an inner pressure variation waveform in the combustion chamber of the internal combustion engine, wherein the oscillation waveform is extracted as a harmonic component from the inner pressure variation waveform in the combustion chamber of the internal combustion engine measured by the inner pressure measurement device, and the harmonic component includes an oscillation frequency component which is unique to the time of occurrence of knocking.

8. The knocking detection method according to claim 1, wherein a cylinder constituting the combustion chamber in the internal combustion engine includes an acceleration sensor configured to detect and output an acceleration detection waveform in the combustion chamber of the internal combustion engine, and wherein the oscillation waveform is obtained as the acceleration detection waveform detected by the acceleration sensor in the internal combustion engine.

9. An ignition timing control method of controlling an ignition timing of ignition of air-fuel mixture in a combustion chamber of an internal combustion engine, comprising:

a detection step of detecting presence or absence of occurrence of knocking in each combustion cycle for the ignition timing which is currently set;

a correlation update step of calculating a variation trend, up to a present time, of a knocking occurrence frequency on the basis of a result of detection of the presence or absence of occurrence of knocking, and updating a correlation between a change in the ignition timing and the knocking occurrence frequency to a latest state; and an ignition timing control step of controlling the ignition timing of the internal combustion engine on the basis of the correlation, wherein the detection step includes:

obtaining an oscillation waveform which is generated by combustion of air-fuel mixture in the combustion chamber;

setting a first time window preceding a maximum inner pressure time at which an inner pressure of the combustion chamber is at maximum in a single combustion cycle and a second time window immediately after the maximum inner pressure time, and transforming each of a first waveform portion included in the first time window and a second waveform portion included in the second time window into an expression-domain expression, of the oscillation waveform; and setting a first frequency window and a second frequency window, extracting a first representative value which is a representative value of the frequency domain expression of the first waveform portion in the first frequency window and a second representative value which is a representative value of the frequency domain expression of the second waveform portion in the second frequency window, and determining whether knocking has occurred on the basis of a relationship between the second representative value and the first representative value.

10. The ignition timing control method according to claim 9, wherein the knocking occurrence frequency is calculated as a proportion of a combustion cycle in which occurrence of knocking is detected to total combustion cycles.

11. A control system configured to control an ignition timing of ignition of air-fuel mixture in a combustion chamber of an internal combustion engine, comprising:

a knocking detection part configured to detect presence or absence of occurrence of knocking in each combustion cycle for the ignition timing which is currently set;

a correlation update part configured to calculate a variation trend, up to a present time, of a knocking occurrence frequency on the basis of a result of detection of the presence or absence of occurrence of knocking, and updating a correlation between a change in the ignition timing and the knocking occurrence frequency to a latest state;

an optimum ignition timing calculation part configured to determine an optimum ignition timing of the internal combustion engine on the basis of the correlation, and an ignition timing control part configured to control the ignition timing by using the optimum ignition timing determined by the optimum ignition timing calculation part as a control target value, wherein the knocking detection part includes:

an oscillation waveform acquisition part configured to obtain an oscillation waveform which is generated by combustion of air-fuel mixture in the combustion chamber;

a time-frequency transform part configured to set a first time window preceding a maximum inner pressure time at which an inner pressure of the combustion chamber is at maximum in a single combustion cycle and a second time window immediately after the maximum inner pressure time, and transform each of a first waveform portion included in the first time window and a second waveform portion included in the second time window into an expression-domain expression, of the oscillation waveform; and a knocking determination part configured to set a first frequency window and a second frequency window, extract a first representative value which is a representative value of the frequency domain expression of the first waveform portion in the first frequency window and a second representative value which is a representative value of the frequency domain expression of the second waveform portion in the second frequency window, and determine whether knocking has occurred on the basis of a relationship between the second representative value and the first representative value.

12. The ignition timing control method according to claim 11, wherein the knocking occurrence frequency is calculated as a proportion of a combustion cycle in which occurrence of knocking is detected to total combustion cycles.

* * * * *